(12) United States Patent
Van Peski

(10) Patent No.: US 11,849,881 B2
(45) Date of Patent: Dec. 26, 2023

(54) PORTABLE COOKING ASSEMBLY

(71) Applicant: Gossamer Gear, Inc., Austin, TX (US)

(72) Inventor: Glen Van Peski, Bend, OR (US)

(73) Assignee: Gossamer Gear, Inc., Austin, TX (US)

( * ) Notice: Subject to any disclaimer, the term of this patent is extended or adjusted under 35 U.S.C. 154(b) by 495 days.

(21) Appl. No.: 17/083,103

(22) Filed: Oct. 28, 2020

(65) Prior Publication Data

US 2021/0127895 A1    May 6, 2021

Related U.S. Application Data

(60) Provisional application No. 62/931,033, filed on Nov. 5, 2019.

(51) Int. Cl.
*A47J 36/36* (2006.01)
*A47J 33/00* (2006.01)
*A47J 36/06* (2006.01)

(52) U.S. Cl.
CPC .............. *A47J 36/36* (2013.01); *A47J 33/00* (2013.01); *A47J 36/06* (2013.01)

(58) Field of Classification Search
CPC ............. A47J 36/36; A47J 33/00; A47J 36/06
See application file for complete search history.

(56) References Cited

U.S. PATENT DOCUMENTS

| | | | | |
|---|---|---|---|---|
| 571,829 A * | 11/1896 | Duncan | ............... | A47J 36/36 220/4.03 |
| 835,715 A * | 11/1906 | Sesseli | ............... | A47J 36/36 126/215 |
| 1,007,461 A * | 10/1911 | Lehmann | ............... | A47J 33/00 126/258 |
| 1,353,265 A * | 9/1920 | Oshige | ............... | A47J 36/36 126/215 |
| 3,658,049 A * | 4/1972 | Gerber | ............... | F24C 15/10 126/215 |
| 5,329,917 A * | 7/1994 | Young | ............... | F24B 1/205 126/30 |
| 7,967,003 B2 | 6/2011 | Lindsly et al. | | |
| 9,808,116 B1 * | 11/2017 | Mummert | ............... | A47J 33/00 |
| 2007/0039603 A1 * | 2/2007 | Lindsly | ............... | A47J 36/36 126/49 |

(Continued)

*Primary Examiner* — Alfred Basichas
(74) *Attorney, Agent, or Firm* — Klarquist Sparkman, LLP

(57) ABSTRACT

Portable cooking assemblies are disclosed herein. The portable cooking assemblies include a windscreen and a cooking vessel assembly. The windscreen includes a body that may be movable between a ready-to-use configuration in which the body defines an inner volume configured to receive the cooking vessel assembly and a compact storage configuration. The windscreen may be configured to fit inside the cooking vessel assembly in the compact storage configuration. The windscreen may include a releasable fastening mechanism that is configured to selectively hold the windscreen in the ready-to-use configuration. The windscreen is configured to hold the cooking vessel assembly above a flame, serving as a base for the cooking vessel assembly. Specifically, the windscreen may include one or more support members that extend radially inwardly from the body when the windscreen is in the ready-to-use configuration, and that are configured to hold and/or center the cooking vessel assembly.

11 Claims, 12 Drawing Sheets

(56) References Cited

U.S. PATENT DOCUMENTS

| | | | | |
|---|---|---|---|---|
| 2008/0302353 | A1* | 12/2008 | Sun | F24B 1/192 |
| | | | | 126/39 K |
| 2014/0069418 | A1* | 3/2014 | Merkurieff | A47J 33/00 |
| | | | | 126/9 R |
| 2014/0326231 | A1* | 11/2014 | Despain | A47J 33/00 |
| | | | | 126/65 |
| 2018/0112883 | A1* | 4/2018 | Huang | F24C 15/28 |

* cited by examiner

PORTABLE COOKING ASSEMBLY

CROSS REFERENCE TO RELATED APPLICATION

This application claims the benefit of U.S. Provisional Application Ser. No. 62/931,033 entitled "WINDSCREEN FOR OUTDOOR COOKING," filed Nov. 5, 2019, which is incorporated by reference herein in its entirety.

FIELD

Described herein are portable cooking gear that can be used while engaging in outdoor activities such as backpacking, hiking, and camping.

BACKGROUND

Popular outdoor activities include, for example, camping, hiking, and backpacking. The exercise associated with such activities provides a variety of health benefits. People who camp, hike, and backpack also enjoy being one with nature, and spending time in locations that are remote. Some participants hike for multiple days, spending one or more nights in areas that are isolated and have limited vehicle accessibility. In such situations, participants typically carry all the equipment they require with them, such as sleeping gear, cooking gear, clothes, food, etc., as they hike or travel.

In recent years, portable cooking gear have gained in popularity as they enable hikers and backpackers to cook food and heat liquids wherever they camp. Portable cooking gear may include a portable stove, fuel for the stove, and a cooking pot. While their size and form allow for easy transportation, portable cooking gear are often inefficient and/or unreliable because they are unprotected from adverse weather conditions. For example, the flame of conventional portable cooking gear is typically directly exposed to the ambient environment and is thus prone to flameouts. Specifically, wind, rain, and/or other adverse weather conditions may extinguish the flame. As another example, heat from the flame may not be efficiently transferred to the cooking vessel and may be lost to the surrounding environment. Additionally or alternatively, cold ambient temperatures, wind, and/or other adverse weather conditions may excessively cool the contents of cooking pot. Due to these heating inefficiencies, cooking times may be longer, and as such, the hiker may have to carry extra fuel, adding to the weight and bulk of their backpack.

SUMMARY

The present disclosure relates to windscreens, cooking assemblies, and/or other portable cooking gear that may be used in outdoor cooking, as well as methods of their use, such as for expediting heating of a cooking vessel during outdoor cooking. The portable cooking gear can include one or more of a cooking vessel, a windscreen, a fuel source, and a burner. The windscreen of the present disclosure reduces and/or prevents flameouts by protecting the flame from wind, rain, hail, snow, and/or other adverse weather conditions, shortens cooking times by improving heat transfer from the fuel source to the cooking vessel, and keeps the contents of the cooking vessel warmer for longer by thermally insulating the cooking vessel. At the same time, the windscreen does not overly restrict airflow to the flame and may include vents that are configured to permit enough airflow through the windscreen to maintain the flame. Further, the windscreen may be disassembled into a compact storage configuration so that the windscreen does not significantly add to the bulk of the cooking assembly. In this way, the windscreen provides a more fuel efficient and effective cooking assembly that is still light, compact, and portable enough to be carried during backpacking and other outdoor activities.

In addition to protecting the flame from adverse weather conditions, the windscreen also may serve as a base for the cooking vessel, holding the cooking vessel above the fuel source and flame during cooking. Specifically, the windscreen can be assembled into a ready-to-use configuration (e.g., an annular and/or quadrangular configuration) in which the windscreen is configured to receive the cooking vessel, and may include inwardly extending projections that are configured to hold, steady, and/or otherwise support the cooking vessel above the fuel source and flame. In some embodiments, the inwardly extending projections also may be configured to center the cooking vessel over the flame to maximize and/or evenly distribute heat transfer to the cooking vessel. In some embodiments, the windscreen may include a releasable fastening mechanism that is configured to secure the windscreen in the ready-to-use configuration so that the windscreen does not move during cooking. In this way, the windscreen may provide a more stable cooking platform for the cooking vessel.

Following use, the windscreen can be disassembled (e.g., by disengaging the releasable fastening mechanism) and collapsed into the compact storage configuration for added portability. For example, the windscreen can be flattened, rolled, and/or folded into the compact storage configuration. In some embodiments, the windscreen may be small enough in the compact storage configuration to fit inside the cooking vessel, further increasing the compactness and portability of the cooking assembly. In this way, the windscreen may increase the portability of the cooking assembly.

In some embodiments, a windscreen for use in outdoor cooking comprises a body, a fastening mechanism, and one or more cooking vessel support members. The body has an upper edge, a lower edge, and first and second opposing end portions. The fastening mechanism is configured to couple the opposing end portions to hold the body in a ready-to-use configuration having an inner volume sized for receiving a cooking vessel. The one or more cooking vessel support members are fixed to an inner surface of the main body and extend from the inner surface of the body into the inner volume to support the cooking vessel in the inner volume.

In some embodiments, an assembly for outdoor cooking comprises a cooking vessel and a windscreen that is configured to hold the cooking vessel above a fuel source. The windscreen comprises a body having an inner volume in a ready-to-use configuration and one or more cooking vessel support members fixed to an inner surface of the body and extending radially inwardly from the inner surface of the body for supporting the cooking vessel received thereon. The assembly may include the fuel source positioned within the inner volume of the body of the windscreen for heating the cooking vessel during the outdoor cooking. The assembly also may include a removable lid for covering the cooking vessel.

In other embodiments, a method for using a cooking assembly comprises assembling a windscreen into a ready-to-use configuration by coupling opposing end portions of a body of the windscreen via a fastening mechanism, the assembled windscreen having a structure with an inner volume; placing the structure of the assembled windscreen upright on a cooking surface; and setting a cooking vessel on one or more support members of the windscreen to hold the cooking vessel above the cooking surface, wherein the one or more support members extend partially into the inner volume of the assembled windscreen. The method may further comprise collapsing the windscreen to a compact storage configuration after a cook cycle and placing the windscreen inside the cooking vessel.

The foregoing and other objects, features, and advantages of the invention will become more apparent from the following detailed description, which proceeds with reference to the accompanying figures.

DETAILED DESCRIPTION

Disclosed herein are cooking gear that are more reliable and efficient (e.g., fuel efficient). Specifically, the windscreens and cooking assemblies disclosed herein minimize and/or prevent flameouts, provide shorter cook times, reduce fuel consumption, and/or keep the contents of a cooking vessel warmer for longer. The windscreen acts as a physical barrier to wind and/or other adverse environmental conditions (e.g., rain, hail, snow, etc.), thereby minimizing the effects of these adverse environmental conditions on cooking characteristics (e.g., flame stability, heat transfer efficiency, heat retention, etc.). Specifically, the windscreen may protect the flame from excessive wind gusts, may improve heat transfer between the fuel source and the cooking vessel, and/or may help thermally insulate the contents of the cooking vessel, thereby reducing cook times and fuel consumption, and preserving water and/or meal temperatures. At the same time, the windscreen may still permit enough air to flow to the flame to maintain the flame. For example, the windscreen may include vents that limit airflow to levels sufficient to maintain the flame.

Further, the windscreens and cooking assemblies disclosed herein may be able to provide these enhanced cooking capabilities without sacrificing portability. Specifically, the windscreens and cooking assemblies disclosed herein may be small and light enough to be taken backpacking and/or carried by a person on other outdoor adventures. The windscreen may movable between an upright ready-to-use configuration and a storage configuration. The windscreen may be moved to the ready-to-use configuration during cooking and may be collapsed (e.g., rolled, flattened, and/or folded) back to the storage configuration when not in use for added portability. In some examples, the windscreen may be small enough when collapsed to fit within a cooking vessel, thereby further increasing the compactness of the cooking assembly.

The windscreens and cooking assemblies disclosed herein may further include a releasable fastening mechanism that is configured to hold the windscreen in the ready-to-use configuration during cooking, but that is configured to be released thereafter so that the windscreen can be flattened, rolled, folded, and/or otherwise collapsed to the compact storage configuration.

Further, the windscreens disclosed herein may be configured to hold a cooking vessel above a flame, thus serving as a base and/or cooking surface for the cooking vessel.

Figure 1:
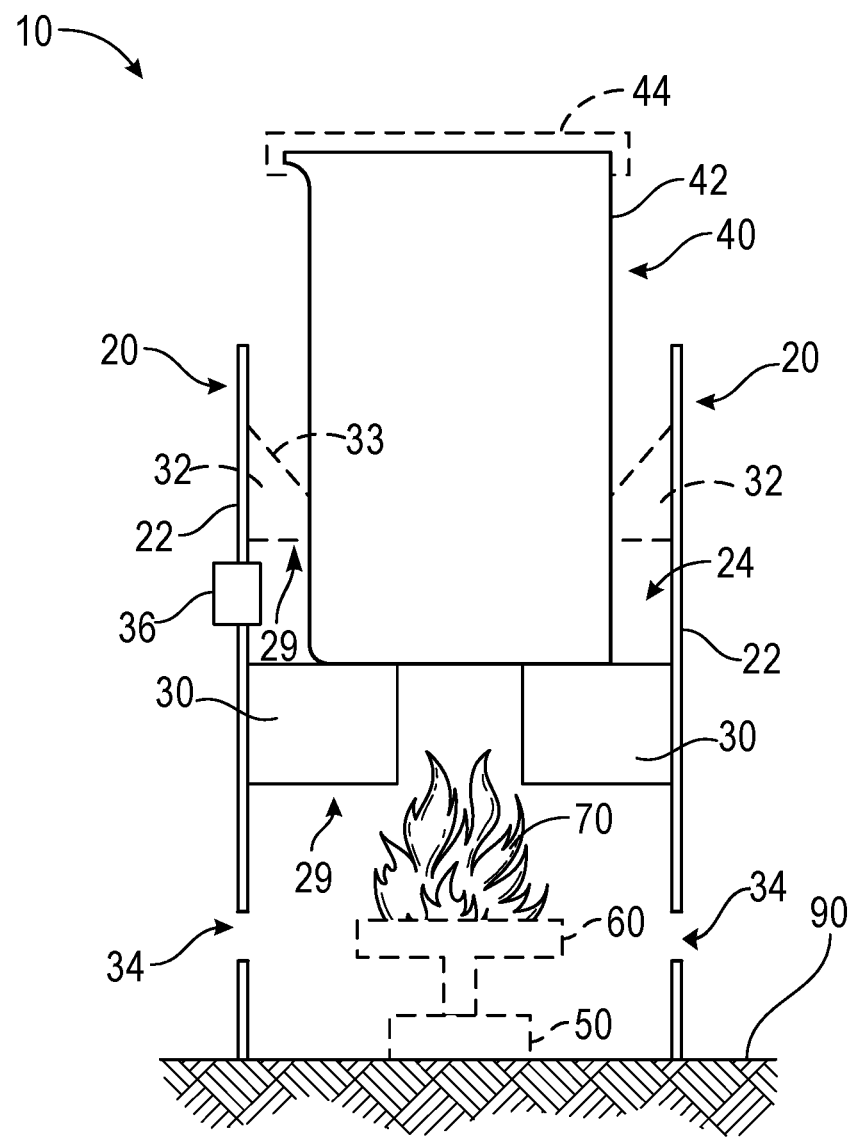
FIG. 1 illustrates a schematic representation of a portable cooking assembly, according to one embodiment.
Figure 17:
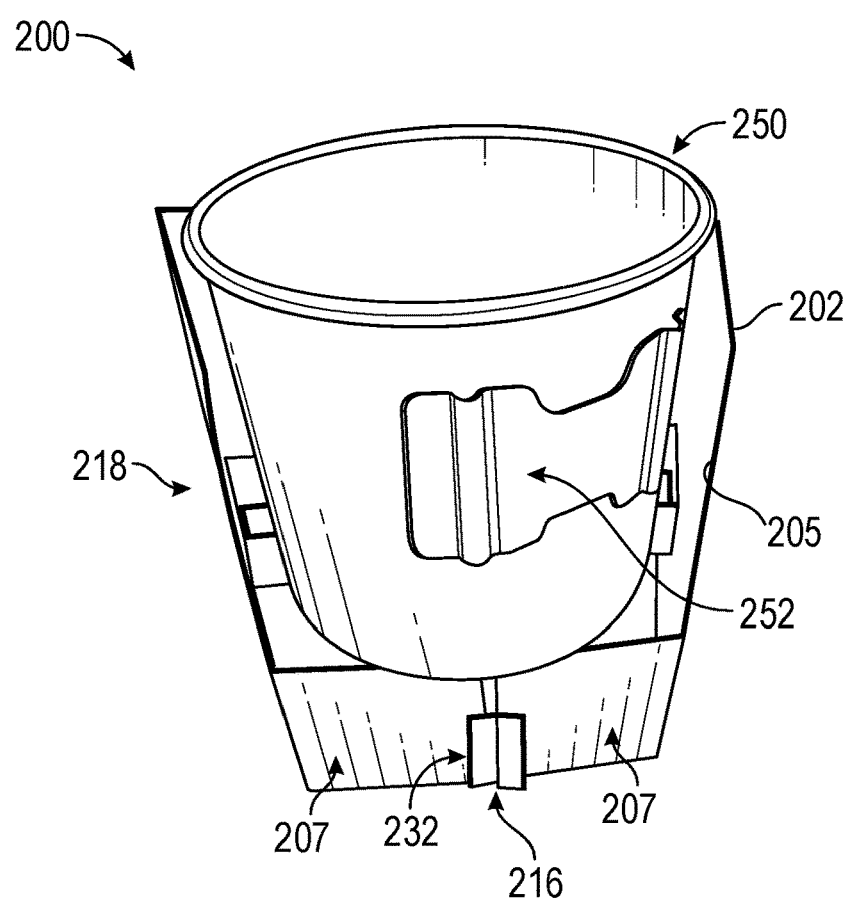
FIG. 17 illustrates a side perspective view of the windscreen of FIGS. 14-16 in the ready-to-use configuration with a cooking vessel reviewed therein.
Figure 18:
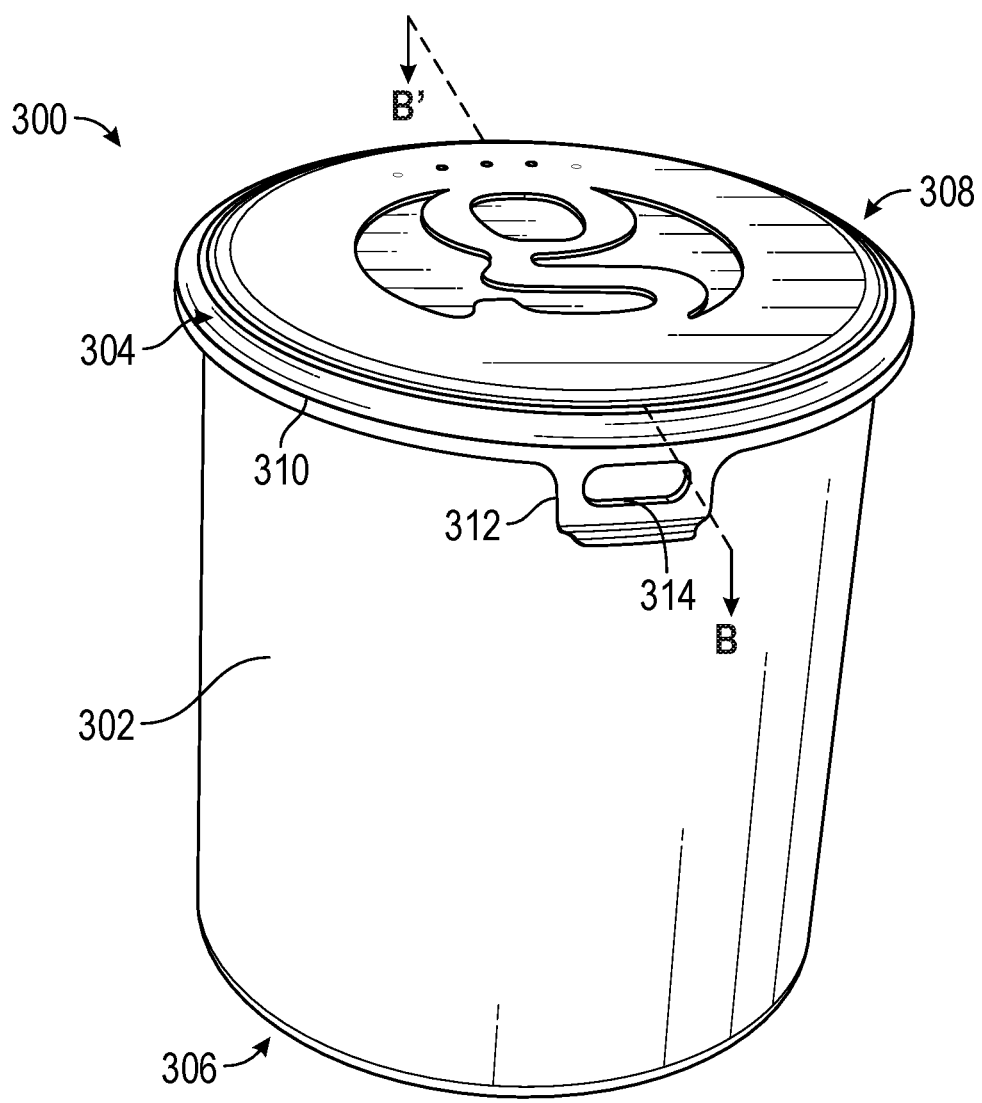
FIG. 18 illustrates a perspective view of a cooking vessel assembly including a pot and lid, according to one embodiment.
Figure 19:
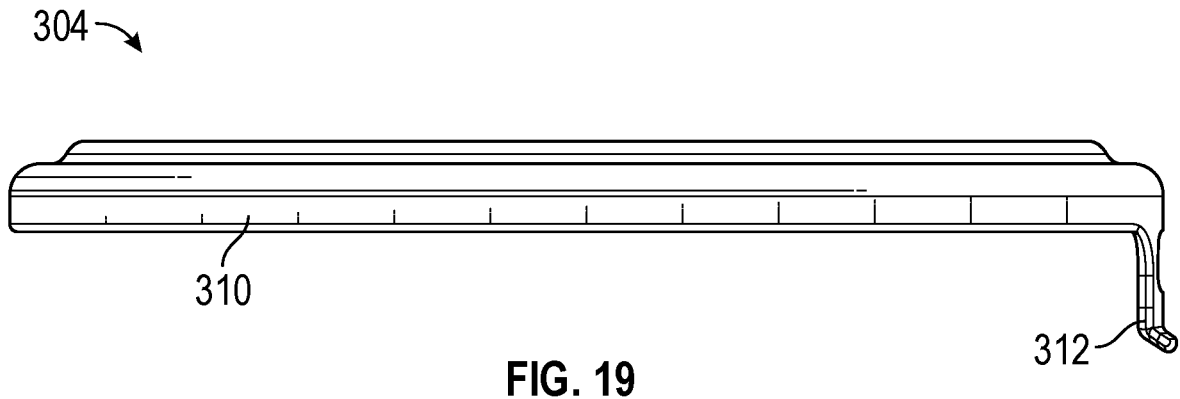
FIG. 19 illustrates a side view of the lid of FIG. 18.
Figure 20:
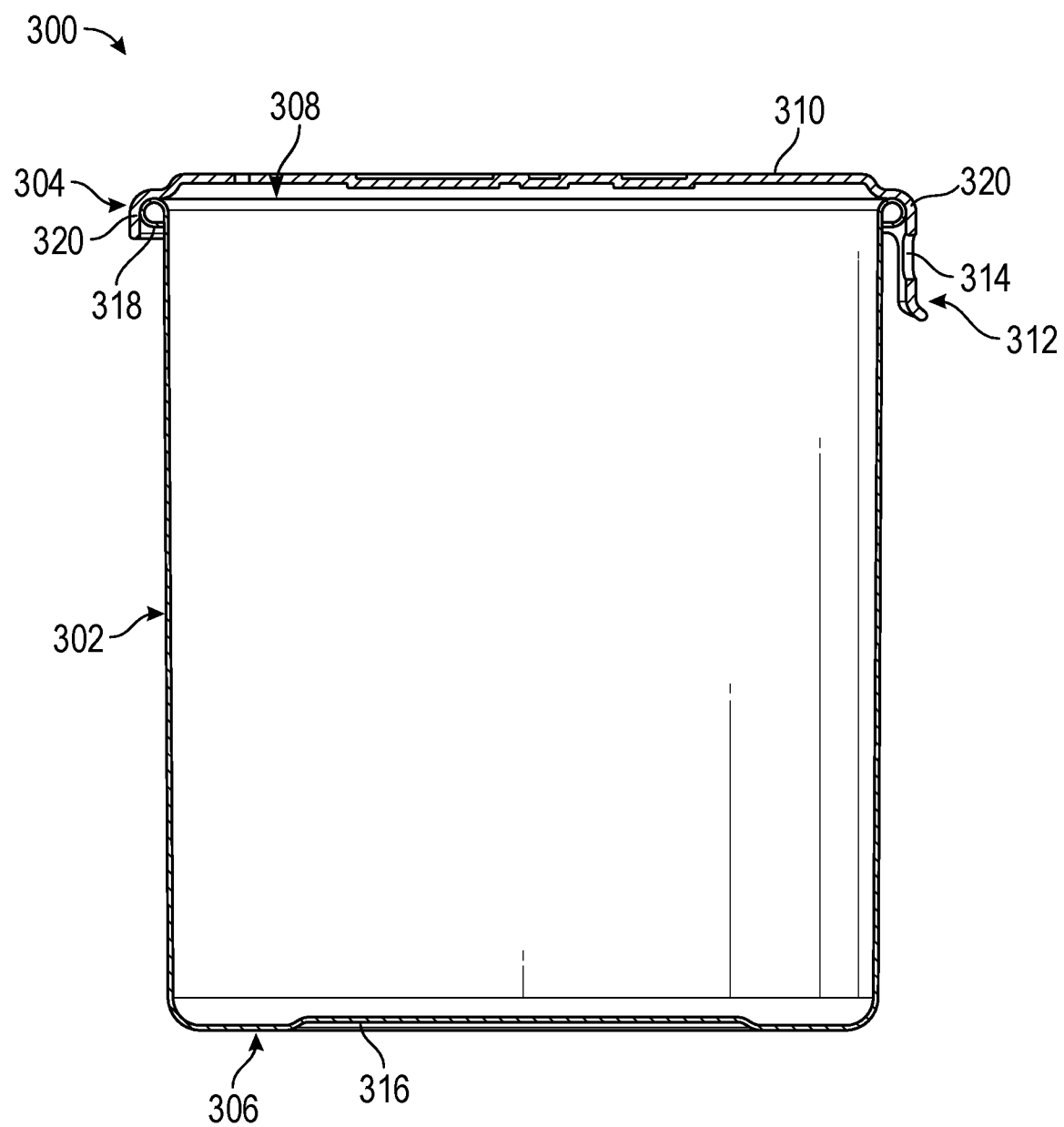
FIG. 20 illustrates a cross-sectional view of the cooking vessel assembly of FIG. 18 taken along cutting plane B-B'.
Figure 21:
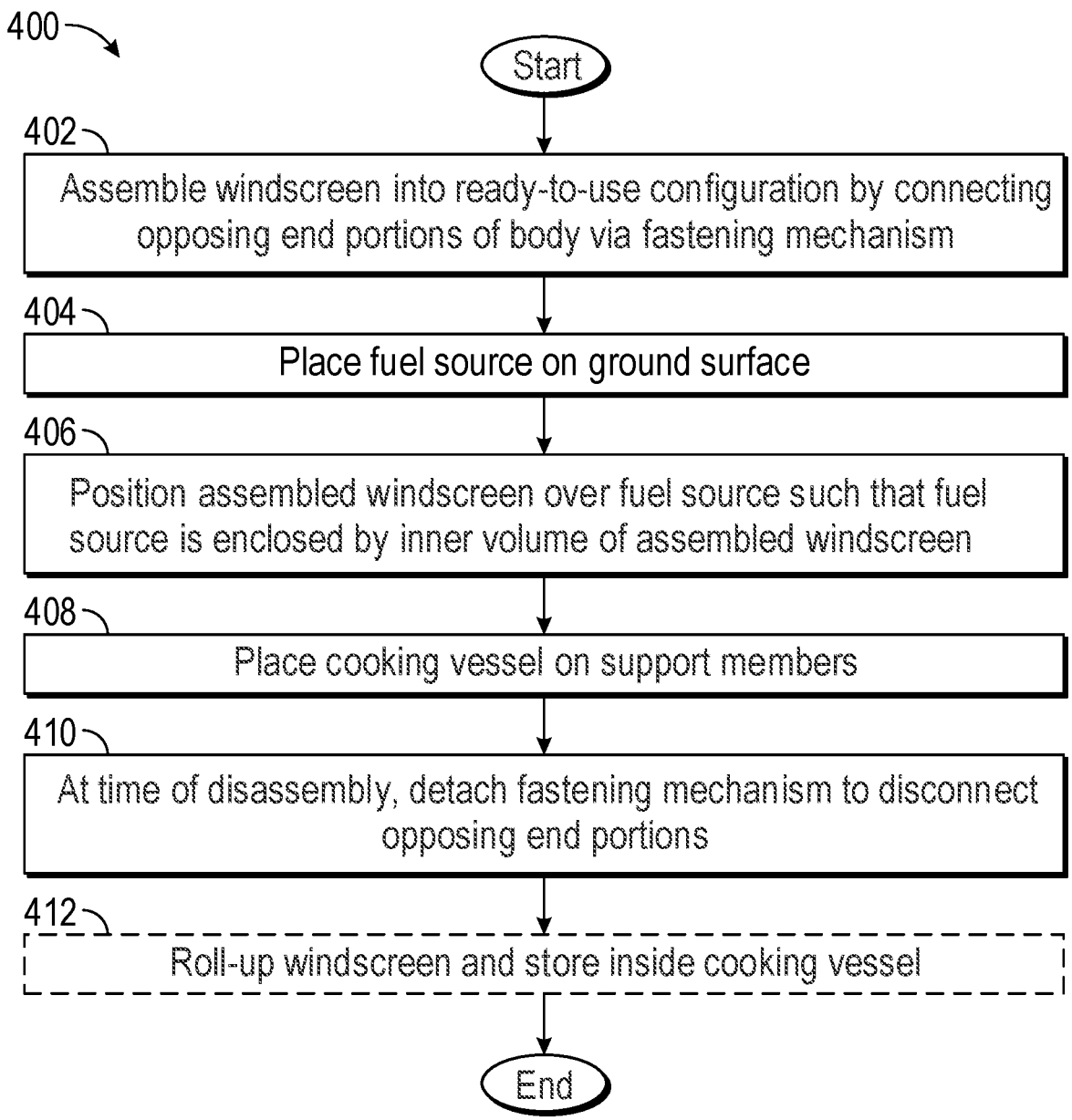
FIG. 21 illustrates a method for using a windscreen and/or cooking assembly of the present disclosure, according to one embodiment

FIG. 1 schematically depicts a portable cooking assembly 10 (which may also be referred to herein as "cooking assembly 10," and/or "portable cookware assembly 10") which includes a windscreen and a cooking vessel and optionally includes a fuel source and/or a burner. FIGS. 2-17 depict various embodiments of windscreens that may be incorporated in a portable cooking assembly (e.g., the portable cooking assembly of FIG. 1), FIGS. 18-20 depict an embodiment of a cooking vessel that may be incorporated in a portable cooking assembly (e.g., the portable cooking assembly of FIG. 1), and FIG. 21 depicts an example method for using a windscreen and/or cooking assembly of the present disclosure.

Figure 5:
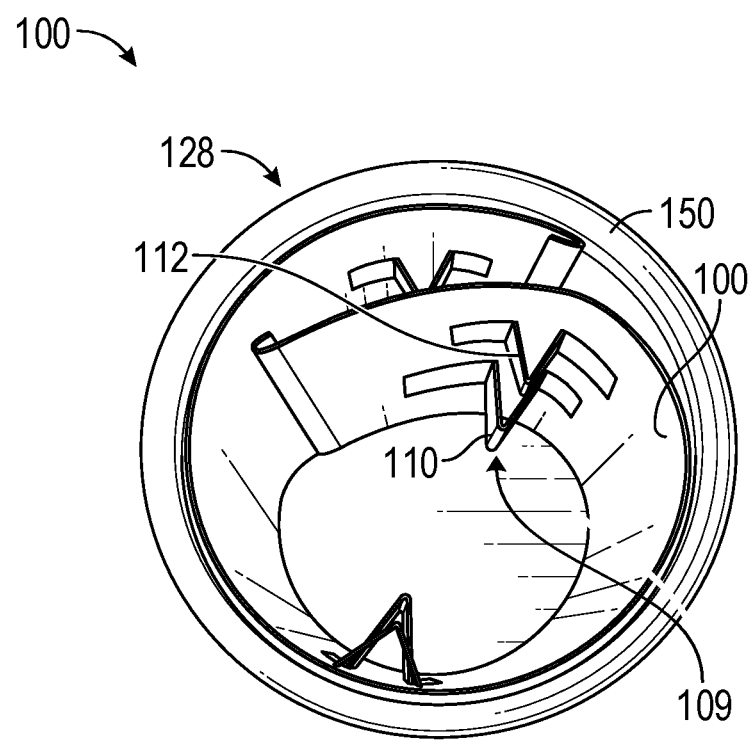
FIG. 5 illustrates a perspective view of the windscreen of FIGS. 2-4 shown in a storage configuration within a cooking vessel.
Figure 15:
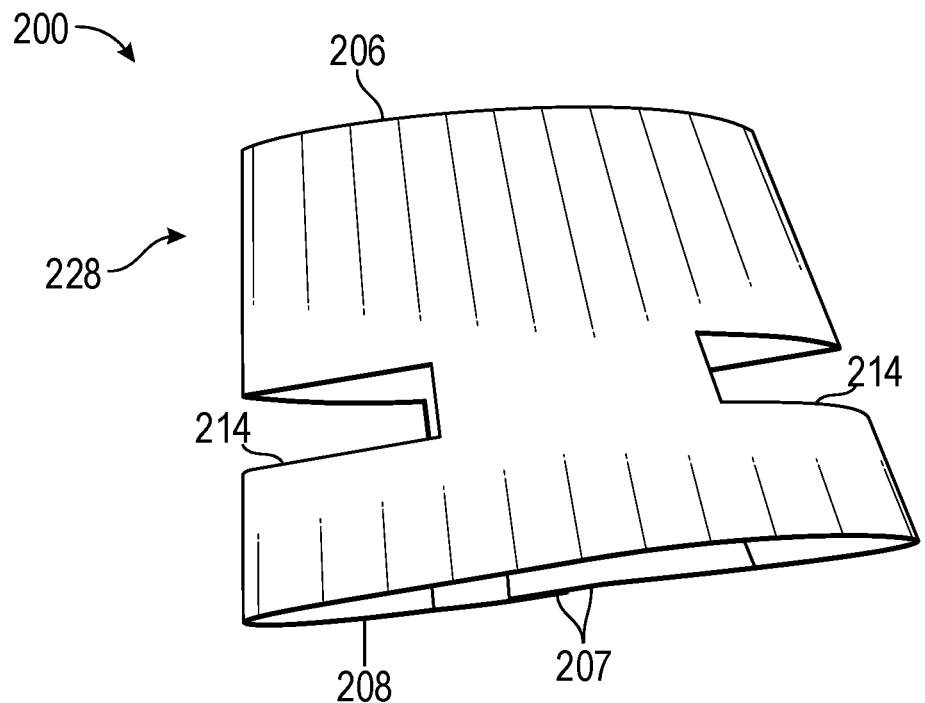
FIG. 15 is a perspective view of the windscreen of FIG. 14, shown in a storage configuration.
Figure 16:
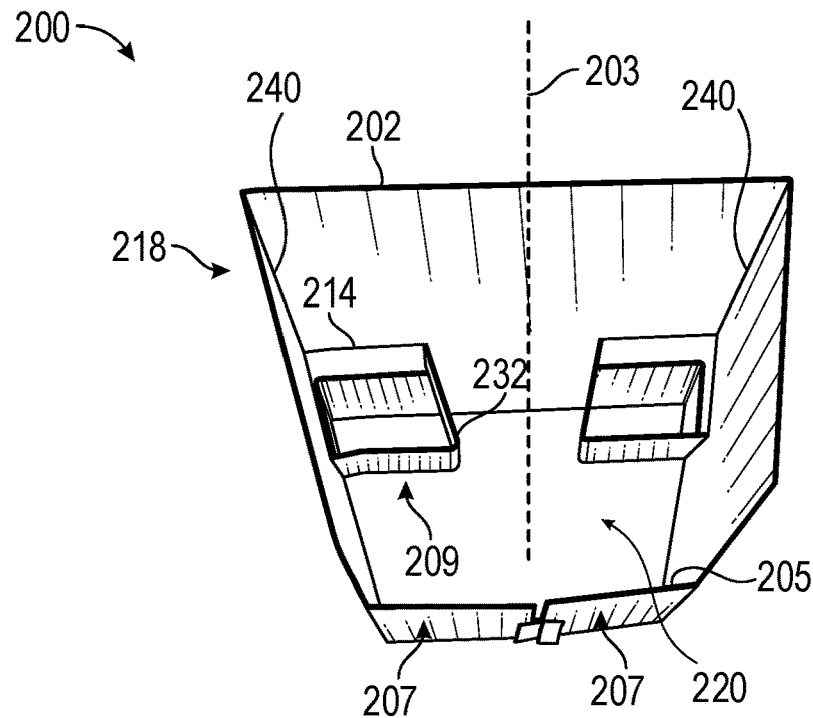
FIG. 16 illustrates a top perspective view of the windscreen of FIGS. 14-15 in a ready-to-use configuration.

As depicted in FIGS. 2-17, the windscreen may have various shapes, sizes, and/or geometries. For example, FIGS. 2-13 depict an annular windscreen while FIGS. 15-17 depict a quadrangular windscreen. Further, the windscreen may be assembled, disassembled, collapsed, and/or otherwise moved between various different positions and/or configurations. Specifically, the windscreen may be readily disassembled and collapsed to a smaller packed size when not in use for added portability. FIGS. 3-4, 6-8, 11, and 16-17 depict the windscreen assembled in a ready-to-use configuration while FIGS. 2, 5, 10, and 15 depict the windscreen disassembled. FIGS. 5 and 15 depict the windscreen collapsed and/or packed into a more compact storage configuration. To assemble the windscreen in the ready-to-use configuration as depicted in FIGS. 3-4, 6-8, 11, and 16-17, the ends of the windscreen may be brought together and/or joined so that the windscreen encloses an inner volume that may receive a cooking vessel. When not in use, the windscreen may be disassembled as depicted FIGS. 2, 5, 10, and may be flattened, rolled, folded, and/or otherwise collapsed into a more compact, portable, and/or packable size, such as one or more of the storage configurations depicted in FIGS. 5 and 15.

Figure 6:
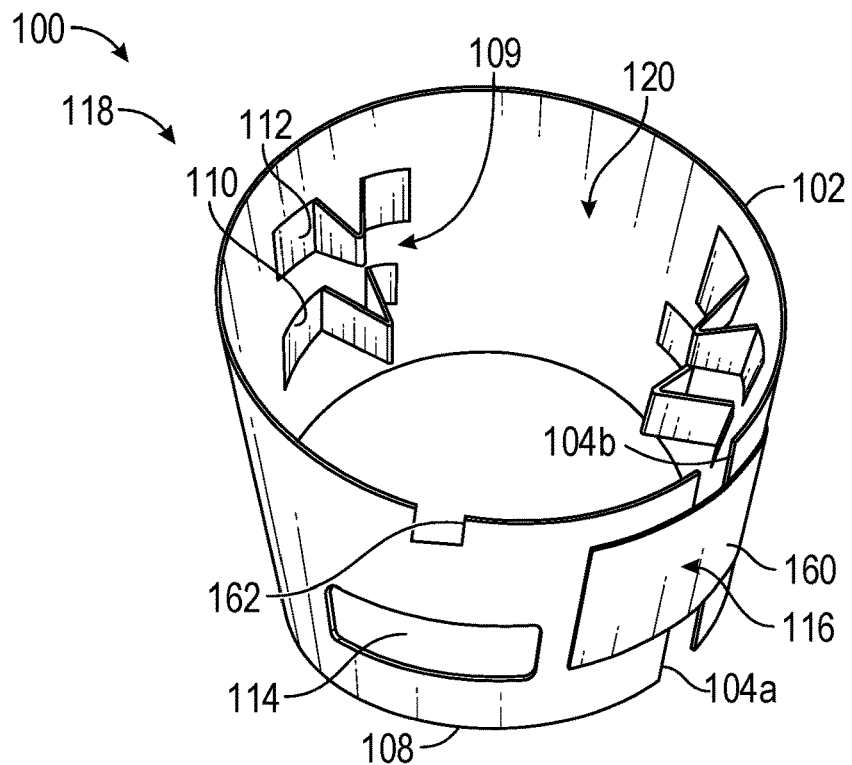
FIG. 6 illustrates a perspective view of the windscreen of FIGS. 2-5 having a second type of fastening mechanism.
Figure 7:
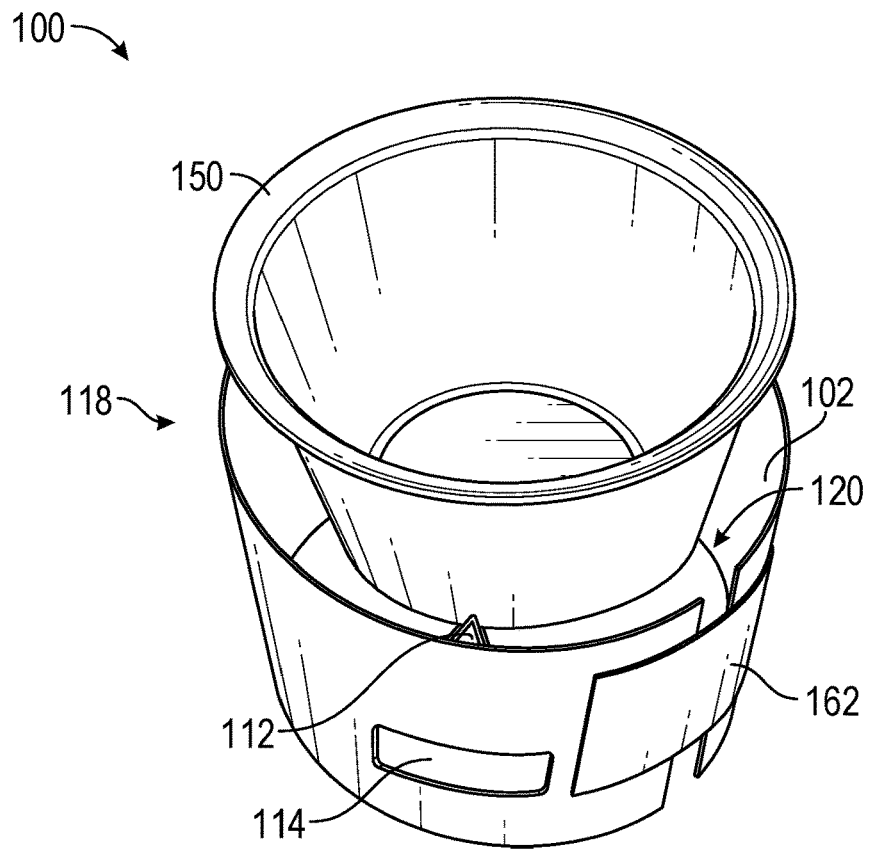
FIG. 7 illustrates a perspective view of the windscreen of FIG. 6 with a cooking vessel received therein.
Figure 8:
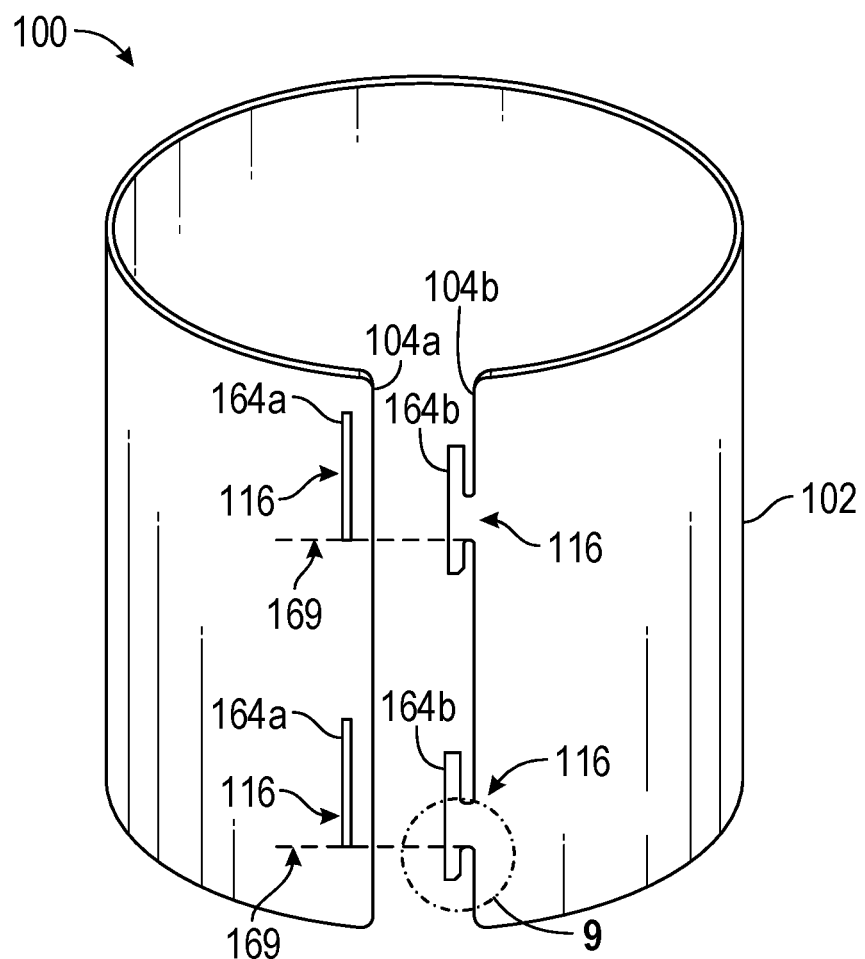
FIG. 8 illustrates a side perspective view of the windscreen of FIGS. 2-7 having a third type of fastening mechanism.
Figure 9:
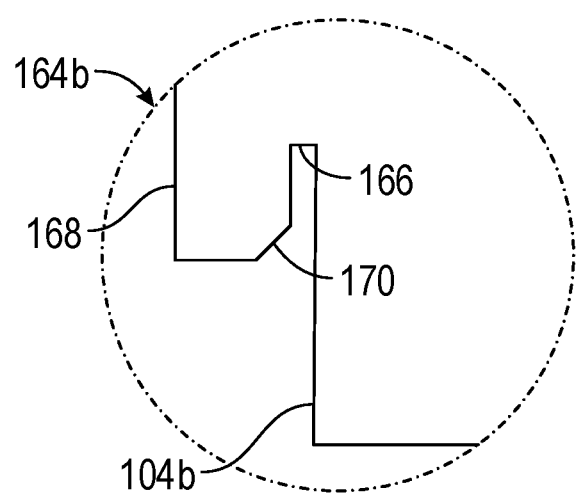
FIG. 9 illustrates a close-up view of the third type of fastening mechanism of FIG. 8.

Additionally or alternatively, the windscreen may include various features/components and/or types of features/components. For example, FIGS. 2-9 and 14-17 depicts various types of fastening mechanisms that may be configured to selectively hold opposite ends of the windscreen together to retain the windscreen in the ready-to-use configuration. FIGS. 2-5 depict a first type of fastening mechanism in which the ends of the windscreen form the fastening mechanism. Specifically, the ends of the windscreen are bent and/or folded back over themselves (e.g., in a U-shaped configuration) such that they interlock with one another in the ready-to-use configuration. FIGS. 6-7 depict a second type of fastening mechanism that comprises a strap that is configured to selectively couple to both ends of the windscreen. FIGS. 8-9 depict a third type of fastening mechanism that comprises tabs and mating slots that receive and selectively hold the tabs. FIGS. 14-17 depict a fourth type of fastening mechanism that comprises interlocking slotted tabs.

As another example, FIGS. 2-7 depict a first type of cooking vessel support member that includes two sets of vertically offset lateral projections of different lengths, a lower set that is configured to hold the cooking vessel above the fuel source and/or flame, and a higher set that is configured to center the cooking vessel over the flame and/or fuel source. FIGS. 10-13 depict a second type of cooking vessel support member comprising a single set of stepped lateral projections that are configured to both hold and center the cooking vessel over the fuel source and/or flame. FIGS. 14-17 depict a third type of cooking vessel support member comprising corner projections that are configured to be included in a quadrangular windscreen to hold and/or center the cooking vessel over the fuel source and/or flame.

FIG. 1 schematically depicts a portable cooking assembly 10 (which may also be referred to herein as "cooking assembly 10" and/or "portable cooking gear 10") that is configured to be taken backpacking and/or on other outdoor adventures. Portable cooking assembly 10 includes a windscreen 20 and a cooking vessel 40, and optionally includes a fuel source 50 and/or a burner 60.

Windscreen 20 is configured to protect, shield, and/or thermally insulate the portable cooking assembly 10 (e.g., burner 60, flame 70, and/or cooking vessel 40) from wind, rain, and/or other adverse weather conditions. Specifically, the windscreen 20 includes a main body 22 that is configured to wrap around and/or surround at least a portion of the cooking vessel 40, burner 60, and/or flame 70 to serve as a physical barrier between one or more of these components of the portable cooking assembly 10 and the surrounding environment. Further, the windscreen 20 may include, may be made of, and/or may be constructed and/or formed from one or more materials that is/are configured to thermally insulate (i.e., retain heat within) the cooking assembly 10 and/or thermally reflect heat back towards the center of the cooking assembly 10. In this way, the main body 22 of the windscreen 20 may minimize the impact that rain, wind, and/or other adverse weather conditions may have on the flame stability, heating efficiency (i.e., heat transfer efficiency between the fuel source 50 and the cooking vessel 40), and/or thermal retention of the portable cooking assembly 10.

In some embodiments, the windscreen 20 may include a thermally insulating material that is configured to retain heat within the cooking assembly 10 and reduce the rate at which the cooking assembly 10 cools (i.e., loses heat to the environment). As one example, the main body 22 of the windscreen 20 may include a flame-resistant and thermally insulating material, such as one or more of a silica, fiberglass, and/or ceramic fiber, that is incorporated into the main body 22 of the windscreen 20. As yet another example, a thermally insulating jacket may be placed around the outside (outer surface) of the main body 22 of the windscreen and may include a thermally insulating material such as a sealed vacuum chamber, cloth, plastic, foam, etc.

In some embodiments, the windscreen 20 may include a thermally reflective material that is configured to reflect heat inwards, back towards the cooking vessel 40, flame 70, burner 60, and/or fuel source 50 to help keep heat within the cooking assembly 10. For example, the windscreen may include a metal such as aluminum. In some examples, the thermally reflective material may be incorporated within the main body 22 of the windscreen 20. In other examples, the thermally reflective material may be included on the inside (inner surface) of the main body 22.

By including a thermally insulating and/or reflective material, the windscreen 20 may improve heat transfer between the flame 70 and the cooking vessel 40, and/or may reduce heat loss from the cooking assembly 10, thereby shortening cook times and preserving cooking vessel temperatures. In this way, the cooking assembly 10 may require less fuel to heat the contents of the cooking vessel 40 (thereby improving fuel efficiency and reducing fuel weight) and may keep the contents of the cooking vessel 40 hotter for longer once the contents have been heated.

As introduced above, the windscreen 20 may wrap around and/or surround the cooking vessel 40, fuel source 50, and/or burner 60. Specifically, the windscreen 20 may at least partially enclose, form, and/or otherwise define an inner volume 24 that is configured (e.g., sized and/or shaped) to receive the cooking vessel 40, fuel source 50, and/or burner 60. For example, the windscreen 20 may be assembled into an annular, quadrangular, and/or other shape having, defining, and/or otherwise forming the inner volume 24. Once the windscreen 20 is assembled, the cooking vessel 40 may be placed inside the windscreen 20, within the inner volume 24.

The windscreen 20 also is configured to serve as a base, holder, platform, and/or cooking surface for the cooking vessel 40. Specifically, the windscreen 20 includes at least one cooking vessel support member 29 (which may also referred to herein as "lateral projections 29," "horizontal projections 29," and/or "inwardly extending projections 29") that is/are configured to hold and/or center the cooking vessel 40 above/over the flame 70 and/or fuel source 50. In the embodiment depicted in FIG. 1, the cooking vessel support members 29 include a plurality of (e.g., at least four) cooking vessel support members 29. However, it should be appreciated that in other examples, fewer or more than four cooking vessel support members 29 may be included in the windscreen 20.

The cooking vessel support members 29 include one or more first support members 30 (which may also be referred to herein as "first set of support members 30," "first projections 30," and/or "vertical support members 30") that is/are configured to hold the cooking vessel 40 above the flame 70 and/or the fuel source 50. That is, the cooking vessel 40 is configured to be placed on, and vertically supported (held up) by, the first support members 30. Thus, the first support members 30 may extend past the edges of the cooking vessel, underneath at least a portion of the cooking vessel 40, to hold the cooking vessel above the flame 70 and/or fuel source 50. As one example, the first support members 30 may extend underneath the bottom of the cooking vessel 40. As another example, the first support members 30 may extend underneath a flange of the cooking vessel 40 that extends radially outwardly from the sides of the cooking vessel 40. Thus, the first support members 30 may be long enough (i.e., may protrude far enough from the main body 22) to extend underneath at least a portion of the first support members 30.

The cooking vessel support members 29 also may include one or more second support members 32 (which may also be referred to herein as "second set of support members 32," "second projections 32," and/or "horizontal support members 32") that is/are configured to center the cooking vessel 40 over the flame 70 and/or the fuel source 50. Unlike the first support members 30, the second support members 32 may allow the cooking vessel 40 to slide past (e.g., slide axially/vertically up and down relative to) the second support members 32, such as when the cooking vessel 40 is placed into and/or taken out of the windscreen 20. As examples, the second support members 32 may not extend past the sides of the cooking vessel 40, may not extend underneath the cooking vessel 40, and/or may not protrude as far from the main body 22 of the windscreen 20 as the first support members 30 (i.e., the second support members 32 may be shorter than the first support members 30).

In some embodiments, the second support members 32 may include ramped surfaces 33 that are angled with respect to the surface on which the windscreen 20 sits to help guide the cooking vessel 40 onto the first support members 30 and/or to facilitate the centering of the cooking vessel 40 over the flame 70. For example, the ramped surface 33 may directly contact the bottom of the cooking vessel 40 when the cooking vessel is being positioned within the windscreen 20 and may passively center the cooking vessel 40 over the flame 70, fuel source 50, and/or burner 60 as the cooking vessel 40 slides vertically/axially downwards towards the fuel source 50.

In some embodiments, the first support members 30 and the second support members 32 are vertically/axially offset from one another. For example, the second support members 32 may be positioned above the first support members 30. However, in other example, the second support members 32 may be positioned below the first support members 30.

In some embodiments, such as the embodiment depicted in FIGS. 10-13, pairs of first support members 30 and second support members 32 may be formed as a single, unitary structures. Thus, the support members 29 may comprise a single set of support structures that are configured to both hold (i.e., vertically support) and center (i.e., horizontally support) the cooking vessel 40 over the flame 70, the fuel source 50, and/or the burner 60.

However, in other embodiments, such as the embodiments depicted in FIGS. 2-7, the first support members 30 and the second support members 32 may comprise distinct and separate structures. For example, the second support members 32 and the first support members 30 may be axially/vertically separated from one another by a gap. As one such example, the second support members 32 may be positioned a distance above the first support members 30. As another such example, the second support members 32 may be positioned a distance below the first support members 30.

In some embodiments, windscreen 20 may include one or more vents 34 that are configured to permit enough air to flow to the flame 70, burner 60, and/or fuel source 50 to maintain and/or stabilize the flame 70. By including the vents 34, the windscreen 20 may provide a controlled and/or regulated flow of air to the flame 70, in effect limiting airflow to a desired range of airflows that provide a more stable flame. Specifically, by blocking wind, the windscreen 20 prevents the airflow reaching the flame 70 from exceeding a threshold that would extinguish the flame 70, while the vents 34 permit enough air to flow to the flame 70 to ensure that the flame 70 does not starve due to oxygen exhaustion. By controlling, regulating, and/or limiting airflow in this manner, the windscreen 20 may maintain a stronger and more stable flame. In this way, windscreen 20 may help ensure that the flame 70 does not extinguish during a cook cycle (i.e., while heating of the cooking vessel 40 is still desired, while the contents of the cooking vessel 40 still require heating and/or cooking, while the fuel source 50 is still expelling/providing fuel, etc.), making for a more reliable cooking assembly.

As introduced above, the cooking assembly 10 may still have a small packed size despite the inclusion of the windscreen 20 because the windscreen 20 can be collapsed to a compact storage configuration. Specifically, the windscreen 20 may be movable between a ready-to-use configuration (FIGS. 3-4, 6-8, 11, and 16-17) and the compact storage configuration (FIGS. 5 and 15) for added portability. In the ready-to-use configuration, the windscreen 20 may form and/or otherwise define the inner volume 24, and thus may surround and/or enclose one or more of the fuel source 50, the burner 60, and the cooking vessel 40. As one example, such as the embodiment depicted in FIGS. 2-13, opposite ends of the windscreen 20 may be brought together and/or joined to enclose, surround, and/or otherwise protect the fuel source 50, burner 60, and/or cooking vessel 40. As another example, the windscreen 20 may be unfolded and/or otherwise radially expanded to the ready-to-use configuration. After use, the windscreen 20 may be flattened, folded, rolled, and/or otherwise collapsed to the compact storage configuration to achieve a smaller packed size. In this way, the windscreen 20 may provide all of its aforementioned cooking benefits (e.g., improved heating efficiency, improved thermal retention, reduced fuel consumption, improved flame stability, etc.) without adding to the bulk of the cooking assembly 10.

In some embodiments, windscreen 20 may include a releasable fastening mechanism 36 that is configured to selectively hold the windscreen 20 in the ready-to-use configuration so that the windscreen 20 provides a more stable base/platform for the cooking vessel 40 during cooking. Specifically, the releasable fastening mechanism 36 may be configured to hold the windscreen 20 in place during a cook cycle, but may be configured to be released, decoupled, detached, unlocked, and/or otherwise disengaged when the cooking assembly 10 is not in use (such as after a cook cycle) to allow the windscreen 20 to be disassembled, collapsed, and/or packed for added portability.

In some embodiments, the windscreen 20 may include a material that may be relatively pliable or bendable to facilitate transitioning (e.g., folding, unfolding, rolling, unrolling, flattening, expanding, etc.) the windscreen 20 between the storage configuration and the ready-to-use configuration.

For example, the windscreen may include, be made of, and/or be constructed and/or formed from a metal, such as titanium, aluminum, stainless steel, copper, brass, galvanized steel, etc., or a composite material, such as fiberglass or a carbon fiber material. In some such examples, the windscreen 20 can be formed from sheet metal comprising any one or more of the aforementioned metals. Additionally or alternatively, the windscreen 20 may include, be made of, and/or be constructed and/or formed from a heat resistant material that is configured to withstand the heat of the flame 70 without bending, melting, softening, and/or otherwise deforming during a cook cycle.

Cooking vessel assembly 40 includes a cooking vessel, such as the illustrated pot 42 (which may also be referred to herein as "cookware 42"), that is configured to hold liquids (e.g., water) and/or solids (e.g., food). In some embodiments, such as the embodiment depicted in FIGS. 18-20, the cooking vessel assembly 40 also may include a lid 44 that is configured to cover a top of the pot 42 to help retain heat with the pot 42. In this way, the lid 44 may thermally insulate the contents of the pot 42, thereby further reducing cook times, saving fuel, and/or keeping the contents of the pot 42 hotter for longer once the contents have been heated by the fuel source 50. The cooking vessel assembly 40 may include, may be made of, and/or may be formed and/or constructed from a heat resistant material, such as a metal, that can withstand the heat of the flame 70 and does not melt, bend, and/or otherwise deform during the cook cycle. In some embodiments, the cooking vessel assembly 40 may include a thermally insulating jacket that wraps, fits, and/or is otherwise positioned around the sides of the pot 42 to further reduce heat loss from the pot 42.

When included in cooking assembly 10, fuel source 50 may comprise one or more of gaseous (e.g., propane/isobutane blend), liquid (e.g., kerosene), and/or solid (e.g., natural wood, hexamine) combustible fuels that are configured to burn (i.e., combust) when ignited by a heat source (e.g., flame from a match, lighter, etc.). In some embodiments, such as when the fuel source comprises a solid fuel, the cooking assembly 10 may not include the burner 60. However, in other embodiments, such as when the fuel source comprises a gaseous and/or liquid fuel, the cooking assembly 10 may include the burner 60.

When included, the burner 60 is configured to regulate the flow of fuel from the fuel source 50 to the flame 70 and/or to control the combustion/burn rate of the fuel. Thus, the burner 60 may be positioned between the fuel source 50 and the flame 70 and, when burner 60 is included, the flame 70 may emanate from the burner 60, instead of directly from the fuel source 50.

As will be explained in greater detail below with reference to FIG. 21, to use (i.e., cook with) the cooking assembly 10, a user may place the fuel source 50 directly on a surface 90 (e.g., on the ground, on an elevated surface such as a table or rock, etc.). If the fuel source 50 requires the burner 60, the user may place the burner 60 on top of the fuel source 50. The user may place the windscreen 20 around the fuel source 50 (e.g., on the same surface 90 as the fuel source 50) in the ready-to-use configuration. Before and/or after doing so, the user may light the fuel source 50 or the burner 60 with an ignition source (e.g., match, lighter, etc.) to create the flame 70. Further, the user may place the cooking vessel 42 inside the windscreen 20 (within the inner volume 24) on the vertical support members 30, and may leave the cooking vessel 42 there until the contents of the cooking vessel 42 reach a desired temperature (e.g., when water in the cooking vessel is boiling) and/or have cooked for a desired amount of time (e.g., when solid food in the cooking vessel is ready to eat).

FIGS. 2-13 depict a windscreen 100, according to one embodiment. Windscreen 100 may be the same as, or similar to, the windscreen 20 described above with reference to FIG. 1 and may be assembled with other cooking gear such as a cooking vessel (e.g., cooking vessel 42), a lid 44, a fuel source (e.g., fuel source 50), and/or a burner (e.g., burner 60) to form a cooking assembly, such as cooking assembly 10. Windscreen 100 comprises a main body 102, cooking vessel support members 109, a releasable fastening mechanism 116, and optionally may include vents 114. The main body 102, support members 109, vents 114, and/or releasable fastening mechanism 116 may be the same as or similar to the main body 22, support members 29, vents 34, and/or releasable fastening mechanism 36, respectively, described above with reference to FIG. 1. Thus, the basic structure and function of these components already described above with reference to FIG. 1 may not be re-introduced below, and only additional and/or alternative features, components, properties, and/or characteristics of these components may be discussed below.

The body 102 includes a first end portion 104a opposite a second end portion 104b and a first edge 106 (which also may be referred to herein as "top 106, "top edge 106," and/or "upper edge 106") opposite a second edge 108 (which also may be referred to herein as "bottom 108," "bottom edge 108," and/or "lower edge 108"). When assembling the windscreen 100 into a ready-to-use configuration 118 (shown at least in FIGS. 3-4, 6-7, and 11), the opposing end portions 104a, 104b of the body 102 may be brought together and/or joined such that the windscreen 100 forms a partially enclosed structure, such as the annular cylindrical structure depicted in FIGS. 3-4, 6-7, and 11. Thus, in the ready-to-use configuration 118, the windscreen 100 may form and/or define an inner volume 120. The inner volume 120 may be configured to receive other components of the cooking assembly, such as a cooking vessel 150 (shown in FIGS. 7 and 13), the fuel source, and/or the burner. Cooking vessel 150 may be the same as and/or similar to cooking vessel 42 described above with reference to FIG. 1. In the ready-to-use configuration 118, the bottom edge 108 of the body 102 may be placed directly on (i.e., may sit on) a cooking surface (e.g., ground) and the body 102 may stand upright on the cooking surface such that the top edge 106 is positioned a distance vertically above the cooking surface.

As introduced above, the releasable fastening mechanism 116 is configured to selectively hold the windscreen 100 in the ready-to-use configuration 118, such as during cooking, by removably coupling the opposing end portions 104a, 104b of the body 102. The releasable fastening mechanism 116 also is configured to be released, decoupled, detached, unlocked, and/or otherwise disengaged so that the windscreen 100 can be disassembled and/or to collapsed, such as to a compact storage configuration 128 (shown in FIG. 5). In some embodiments, such as the embodiment depicted in FIG. 5, the windscreen 100 may fit inside the cooking vessel 150 when in the compact storage configuration 128.

In some embodiments, such as the examples depicted in FIGS. 2-5 and 8-9, the fastening mechanism 116 may be integrally formed with (i.e., may be unitary with) the body 102. For example, in the embodiment depicted in FIGS. 2-5, the opposing end portions 104a, 104b of the body 102 may be bent and/or folded back over the body 102 in opposite directions, such that they form interlocking hooks. Specifically, the first end portion 104a may be curved away from the body 102 in a first direction forming a first member 116a of the fastening mechanism 116 and the second end portion 104b may be curved away from the body 102 in a second direction, opposite the first direction, forming a second member 116b of the fastening mechanism 116. For example, when the opposing end portions 104a, 104b are brought together to assemble the windscreen 100 in the ready-to-use configuration 118, the first member 116a of the fastening mechanism 116 may bend radially outwardly and the second member 116b may bend radially inwardly. In this way, the members 116a, 116b may include one or more of U-shaped flanges, hooks, and/or other types of curved latching structures.

To couple, attach, and/or otherwise engage the first and second members 116a, 116b of the fastening mechanism 116 (and thereby releasable couple, secure, fasten, and/or otherwise hold the windscreen 100 in the ready-to-use configuration 118), the first and second members 116a, 116b may be extended past one another, such that they overlap and interlock with one another. Specifically, the opposing end portions 104a, 104b of the body 102 may be extended past and around one another. Stated slightly differently, the first end portion 104a may be inserted into the second member 116b of the fastening mechanism 116, and the second end portion 104b may be inserted into the first member 116a such that the two members 116a, 116b overlap and hook onto each other, as shown in the embodiments depicted in FIGS. 3-4. The body 102 may be naturally biased to return to the flattened configuration shown in FIG. 2, and in this way, may passively urge the two members 116a, 116b to remain interlocked and/or otherwise engaged with one another, thereby holding the windscreen 100 in the ready-to-use configuration 118.

To release, detach, decouple, and/or otherwise disengage the first and second members 116a, 116b (such as when disassembling and/or collapsing the windscreen 100), the opposing end portions 104a, 104b may be extended past one another and radially separated from one another (i.e., the opposing end portions 104a, 104b may be moved in opposite radial direction, away from one another). For example, the first end portion 104a may be moved radially inwardly and second end portion 104b may be moved radially outwardly. Once the two members 116a, 116b are separated from one another, the natural bias of the body 102 may return the body 102 towards the flattened configuration shown in FIG. 2. As illustrated in FIG. 5, the body 102 may be rolled to the compact storage configuration 128 and placed inside the cooking vessel 150 for added portability.

Figure 10:
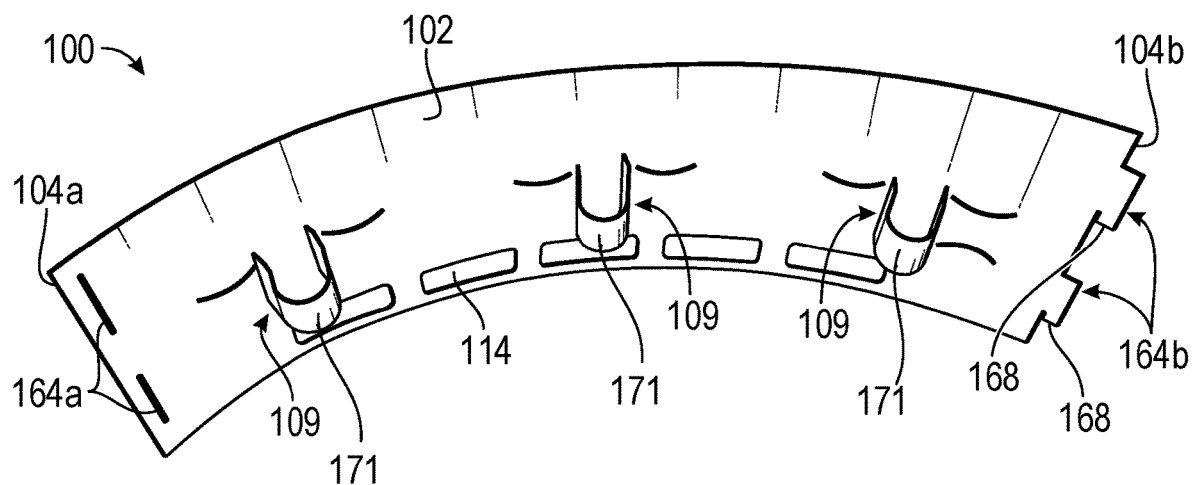
FIG. 10 illustrates a perspective view of the windscreen of FIGS. 2-9 in a disassembled configuration, having a second type of cooking vessel support members.

FIGS. 8-10 depict another example where the fastening mechanism 116 may be integrally formed with the body 102. In the example depicted in FIGS. 8-10, the fastening mechanism 116 may comprise a tab and slot style fastener that includes tabs 164b received in corresponding slots 164a. The tabs 164b may extend from the second end portion 104b of the body 102 and the slots 164a may be formed in the body 102 near the first end portion 104a. Specifically, the tabs 164b may include a stem portion 166 (FIG. 9) that extends away from the second end portion 104b of the body 102 and one or more flanges 168 (FIG. 9) that extend vertically/axially away from the stem portion 166.

The tabs 164b may be configured to extend through the slots 164a and catch on the backside of the opposing end portion of the body 102 (in which the slots 164a are included) so that they do not pull out of the slots 164a while the windscreen 100 is in use. Specifically, when inserted through the slots 164a, one or more of the flanges 168 may be configured to extend past the end(s) of the slots 164a over the surface of the end portion 104a of the body 102 to hold the windscreen 100 in the ready-to-use configuration 118.

As one example, the tabs 164b may be oversized relative to the slots 164a (e.g., the tabs 164b may be wider than the slots 164a) and thus may form a grommet style fastener. In such examples, the tabs 164b may be pushed, folded, pivoted, rotated, and/or otherwise articulated to pass through the slots 164a. As just one such example, one of the flanges 168 may be extended through one of the slots 164a and moved vertically relative to the slot 164a until the stem portion 166 abuts the end of the slot 164a. Then, the tabs 164b may be pivoted about this stem-slot abutment until the other flange 168 passes through the slot 164a. After passing through the slots 164a, one or more of the flanges 168 of the oversized tabs may catch on the backside of the body 102 thereby coupling, securing, fastening, and/or otherwise holding the windscreen 100 in the ready-to-use configuration 118.

As another example, the tabs 164b may not be wider than the slots 164a and may be extended through the slots 164a by, for example, simply sliding the tabs 164b through the slots 164a, without needing to fold, pivot, and/or otherwise articulate the flanges 168. In some such examples, the tabs 164b may be moved vertically (e.g., downwards) once they have passed through the slots 164a so that at least one of the flanges 168 catches on the opposing end portion of the body 102. In some such examples, the bottom edge of the stem portion 166 may sit on (directly abut) the bottom end of the slot 164a, with the flange 168 extending behind the backside of the body 102.

Thus, the slots 164a may be wide enough to allow the tabs 164b to be inserted there-through, while narrow enough to hold the tabs 164b in place and prevent slip-out of the tabs 164b. In the examples depicted in FIGS. 8-9, each slot 164a may be positioned such that it aligns with a bottom edge of the stem portion 166, along alignment axis 169 (dashed line in FIG. 8).

In some embodiments, such as the embodiment shown in FIGS. 8-9, the flanges 168 may include a tapered, ramped, and/or otherwise angled corner 170. FIG. 9, which shows a close-up view of section 9 shown FIG. 8, depicts this tapered corner 170. As shown, the tapered corner 170 may be provided on the corner of the flange 168 positioned more proximate to the body 102. In some embodiments, the tapered corner 170 can be formed by clipping or cutting of a corner of the flange 168. The tapered corner 170 may allow the tabs 164b to pass more easily through the slots 164a, thereby facilitating the coupling and decoupling of the fastening mechanism 116.

In the embodiment depicted in FIGS. 8-9, the fastening mechanism 116 includes two tabs 164b and two slots 164a, where each of the tabs 164b is configured to be inserted through a unique one of the slots 164a. However, it should be appreciated that in other embodiments, the fastening mechanism 116 may include more or less than two tabs 164b and/or two slots 164a. For example, FIG. 10 depicts an embodiment where each of the tabs 164b includes only one flange 168 on the bottom of each of the tabs 164b.

Although FIGS. 2-5 and 8-9 depict certain types of mechanical fastening mechanisms, it should be appreciated that the fastening mechanism 116 may additionally or alternatively include other suitable types of mechanical fastening mechanisms such as one or more of snap-fit fasteners, pin and hole arrangements, hook and loop fasteners, buckles, clasps, clamps, latches, etc. Further, although FIGS. 2-5 and 8-9 depict embodiments where the fastening mechanism 116 is a mechanical fastening mechanism, it should be appreciated that the fastening mechanism 116 may additionally or alternatively include other types of fastening mechanisms such as one or more of magnets, adhesives, friction devices (e.g., sticky pads), vacuum devices (e.g., suction cups), and/or other types of non-mechanical fastening mechanisms.

In another example, such as the embodiments depicted in FIGS. 6-7, the fastening mechanism 116 may comprise a strap or clasp 160. The strap 160 may be permanently and/or removably coupled to the first end portion 104a and/or the second end portion 104b via friction forces, magnets, and/or fasteners (e.g., buttons, buckles, and/or other snap-fit style fasteners, clips, and/or other clamping style fasteners, hook and loop style fasteners (e.g., Velcro®), etc.). In examples where the fastening mechanism 116 comprises the strap 160, the opposing end portions 104a, 104b may not overlap with each other and may be separated from one another by a gap, unlike the interlocking hook style fastening mechanism depicted in FIGS. 2-5 and/or the tab and slot style fastening mechanism depicted in FIGS. 8-9. However, in other examples, the end portion 104a, 104b may abut and/or overlap with one another even when the fastening mechanism 116 includes the strap 160.

The cooking vessel support members 109 include one or more first support members 110 (which also may be referred to herein as "first set of support members 110," "first projections 110," and/or "vertical support members 110") and optionally may include one or more second support members 112 (which also may be referred to herein as "second set of support members 112," "second projections 112," and/or "horizontal support members 112"). The first support members 110 and second support members 112 may the same as or similar to the first support members 30 and second support members 32 described above with reference to FIG. 1. As such, the first support members 110 may be configured to hold the cooking vessel 150 above a flame (e.g., flame 70) and the second support members 112 may be configured to center the cooking vessel 150 over the flame.

The first support members 110 and the second support members 112 extend outwardly from the same side of the main body 102 of the windscreen. In the ready-to-use configuration 118, the first support members 110 and the second support members 112 extend radially inwardly from an inner surface of the main body 102. The first support members 110 may be aligned on the same horizontal plane (i.e., positioned at the same height on the main body 102), and may be circumferentially distributed symmetrically (as shown in FIGS. 3-7 and 10-13) or asymmetrically along a width (W) (FIG. 2) of the body 102. Similarly, the second support members 112 may be aligned on the same horizontal plane (i.e., positioned at the same height on the main body 102), and circumferentially distributed symmetrically (as shown in FIGS. 3-7 and 10-13) or asymmetrically along the width (W) of the body 102. However, in other embodiments not all of the first support members 110 may be positioned at the same height and not all of the second support members 112 may be positioned at the same height.

Figure 2:
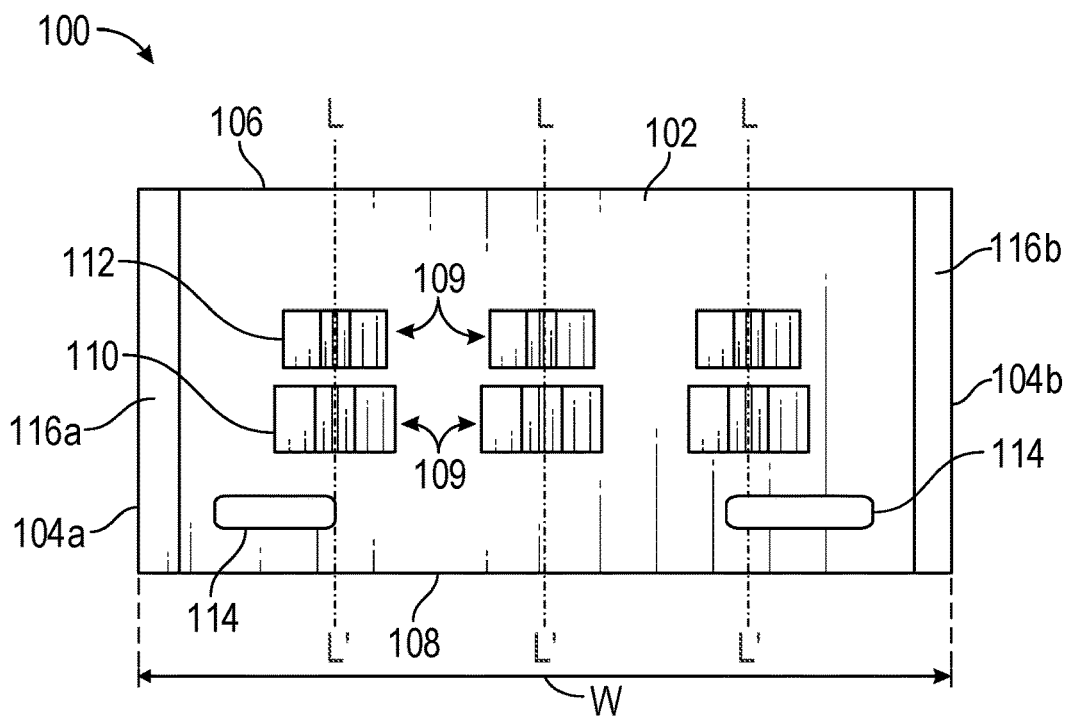
FIG. 2 illustrates a side view of a windscreen in a disassembled configuration, according to a first embodiment, having a first type of fastening mechanism and a first type of cooking vessel support members.
Figure 3:
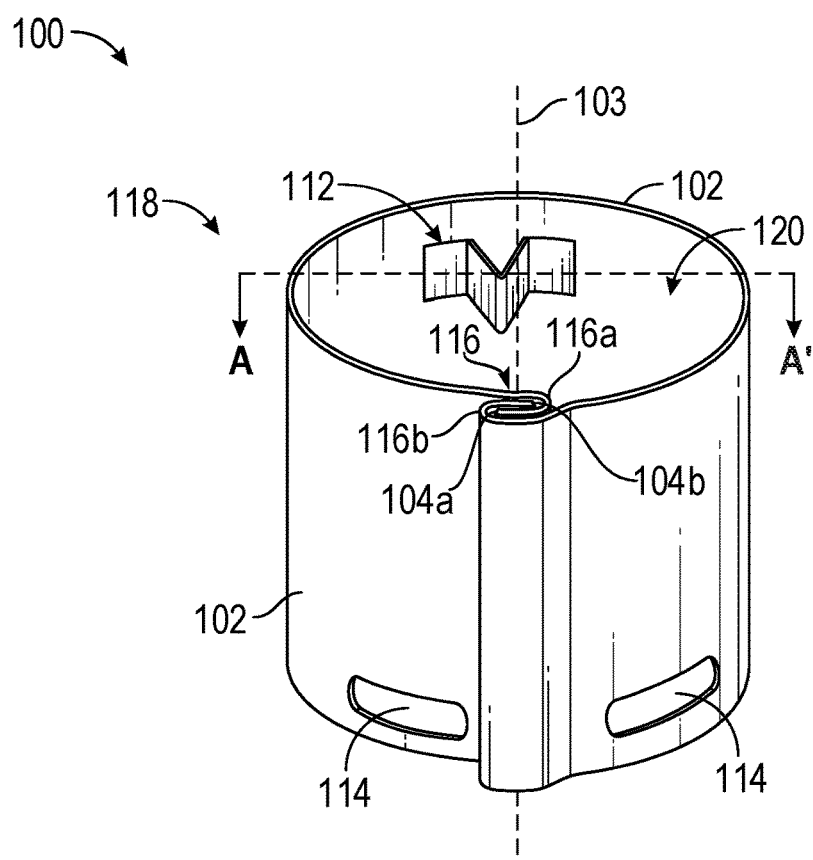
FIG. 3 illustrates perspective view of the windscreen of FIG. 1 in a ready-to-use configuration.
Figure 4:
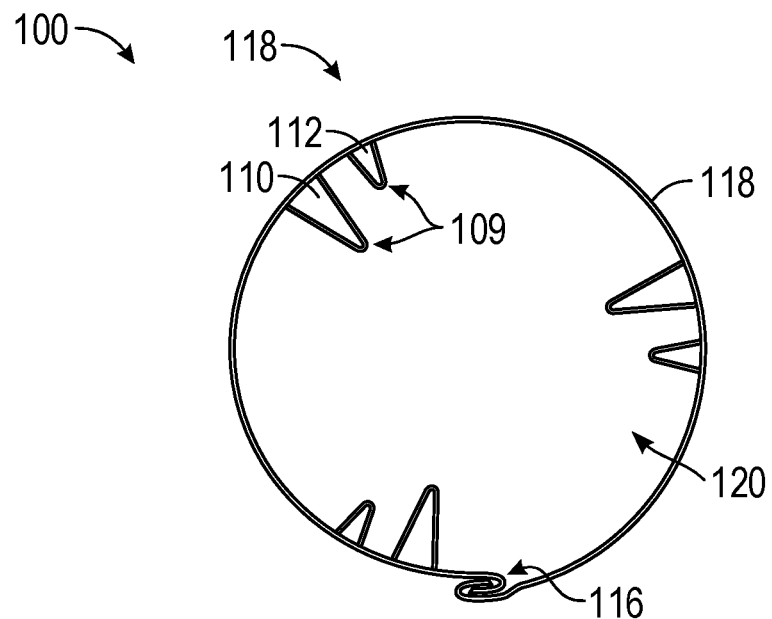
FIG. 4 illustrates a top view of the windscreen of FIGS. 2-3 in the ready-to-use configuration.

In some embodiments, such as the embodiments depicted in FIGS. 2-3, 5-7, and 10-13, the first and second support members 110, 112 may be longitudinally aligned with one another, such that each one of the second support members 112 is centered above (aligned on the same vertical axis as) one of the first support members 110. Specifically each of the first support members 110 may be circumferentially aligned with one of the second support members 112 along a common vertical axis L-L' (FIG. 2). The common longitudinal axis is parallel to a central longitudinal axis 103 (dashed line in FIG. 3) of the main body 102 when in the ready-to-use configuration 118. However, in other embodiments, such as the embodiment depicted in FIG. 4, the first and second support members 110, 112 may be longitudinally/circumferentially offset from one another.

As depicted in FIGS. 3-7 and 10-13, the second support members 112 may be shorter than (may not extend as far from the body 102 into the inner volume 120 as) the first support members 110 and may be positioned vertically above the first support members 110 (i.e., the second support members 112 may be positioned closer to the top edge 106 and farther from the bottom edge 108 of the body 102 than the first support members 110). In some embodiments, such as the embodiments depicted in FIGS. 3-7, the first support members 110 and the second support members 112 may comprise distinct structures that are separated from one another by a vertical distance. That is, the second support members 112 may be vertically offset from (positioned a distance above) the first support members 110.

However, in other embodiments, such as the embodiments depicted in FIGS. 10-13, the first support members 110 and the second support members 112 may be integrally formed unitary structures 171 (which also may be referred to herein as "integral units 171"). Specifically, each one of the first support members 110 may be integrally formed with a unique one of the second support members 112. For example, in the embodiments depicted in FIGS. 10-13, the windscreen 100 includes three first support members 110 each of which is integrally formed a unique one of the three second support member 112, to form three integrated support members 109. However, in other embodiments more or less than three first support members 110 and/or three second support members 112 may be included in the windscreen 100. In the embodiments depicted in FIGS. 3-7, the windscreen 100 includes six support members 109, since the three first support members 110 and the three second support members 112 are formed as separate structures. In some examples, the windscreen may include the same number of the first support members 110 and the second support members 112. However, in other examples, the windscreen 100 may include more or less of the first support members 110 than the second support members 112.

Thus, each one of the unitary structures 171 includes one of the first support members 110 and one of the second support members 112. The first support members 110 may include a cooking surface 172 (FIGS. 12-13) (which also may be referred to herein as "cooking vessel surface 172," "upper surface 172," and/or "support surface 172") upon which the cooking vessel 150 is configured to be placed, as shown in FIG. 13. The second support members 112 may include a centering surface 174 (FIGS. 12-13) (which also may be referred to herein as "side surface 174") that is configured to center the cooking vessel 150 over the flame, as shown in FIG. 13. In the example depicted in FIGS. 12-13, the first support members may be substantially U-shaped. However, in other examples, the first support members may have other shapes, such as rectangular, trapezoidal, elliptical, and/or other geometric and/or non-geometric shapes. For example, in the embodiments shown in FIGS. 3-7, the support members 109 may be substantially triangular when viewed in a plane orthogonal to the central longitudinal axis 103.

In some embodiments, the support members 109 can be hollow. For example, the support members 109 can be folded and attached at their ends to the body 102 so that they define a hollow region. As one such example, the support members 109 can be rectangular pieces of material (e.g., sheet metal) that are folded or bent along a central fold axis to create the triangular shape shown in FIGS. 3-7. As another example, the support members 109 can be bent in a curved manner to be U-shaped, like in FIGS. 10-13. In other examples, the tabs may have a different shape, a different fold pattern, and/or can be solid pieces of material. For example, the projections may be provided as solid or hollow quadrangular tabs. Irrespective of the shape, the first support members 110 are stiff enough to support the weight of the cooking vessel 150, as well as food or liquid contained therein. For example, the first support members 110 and/or the second support members 112 may be made of the same material as the body 102 of the windscreen 100, such as a metal or metal alloy (e.g., titanium, aluminum, stainless steel, copper, brass, galvanized steel, etc.) or a composite material, such as fiberglass or a carbon fiber material. In other embodiments the first support members 110 and/or the second support members 112 may be made of a material that is different from the material used to manufacture the body 102 of the windscreen 100.

The first support members 110 and/or the second support members 112 may be coupled to the inner surface of the body 102 via welding, glue, mechanical fasteners (e.g., screws or rivets), a press-fit connection, and/or other suitable attachment means. In an alternative embodiment, the body 102 can have a ribbed structure such that the first support members 110 and/or the second support members 112 are integrally formed with the body 102; that is, the main body 102 and the first support members 110 and/or the second support members 112 comprise a one-piece unitary construction without any welds, adhesives, or fasteners coupling the first support members 110 and/or the second support members 112 to the main body 102. For example, the ribbed structure may include ribs extending along a length of the body 102 and positioned at locations where the first support members 110 and/or the second support members 112 are desired.

Figure 11:
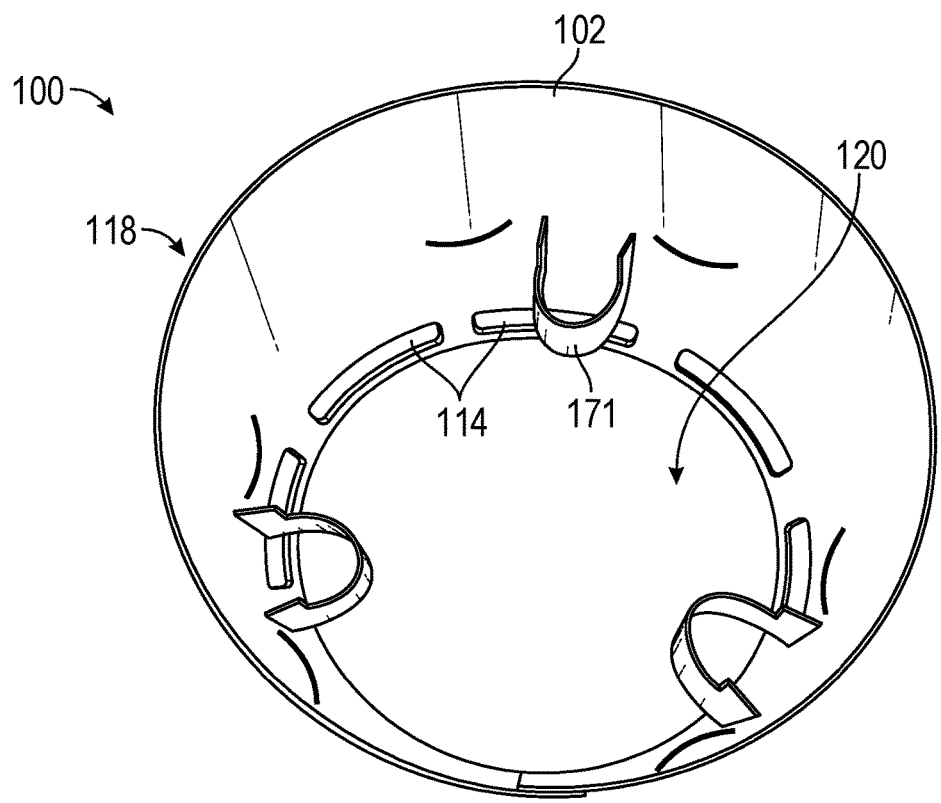
FIG. 11 illustrates a top perspective view of the windscreen of FIG. 10 in a ready-to-use configuration.
Figure 12:
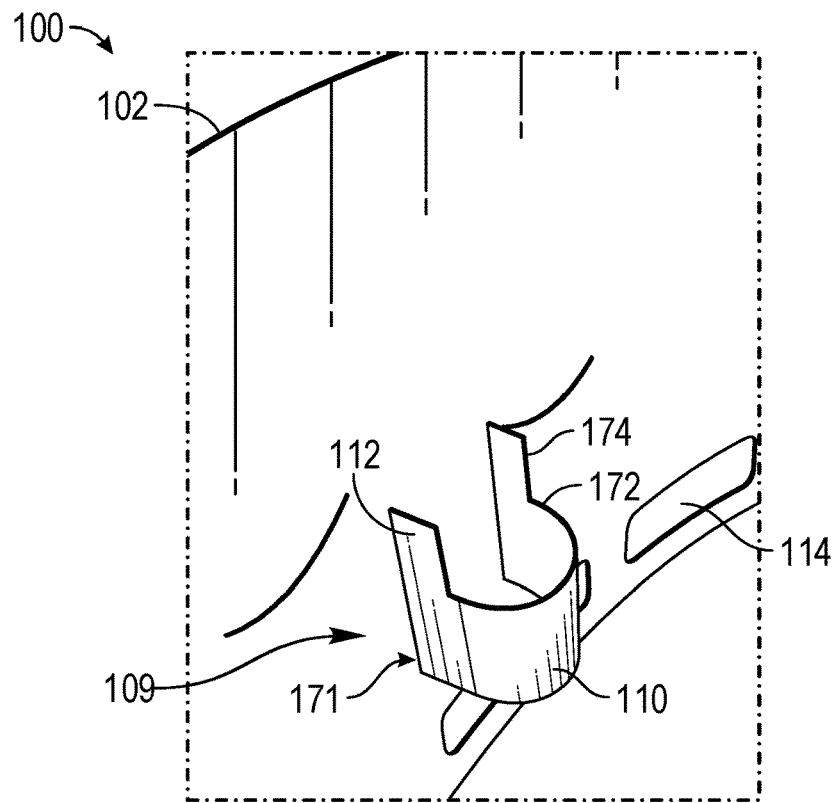
FIG. 12 illustrates a close-up view of the second type of cooking vessel support members of FIGS. 11-12.
Figure 13:
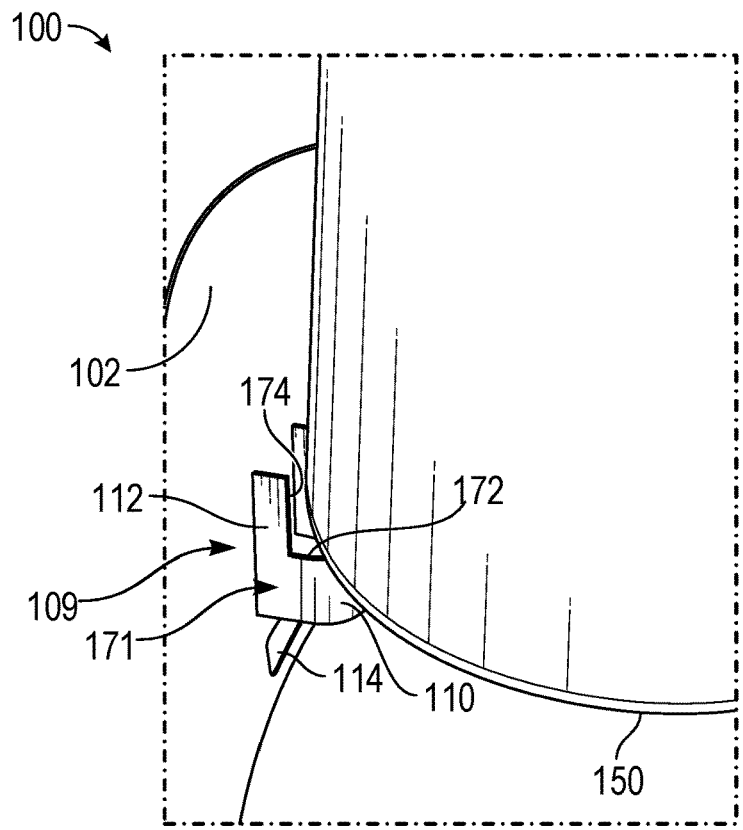
FIG. 13 illustrates a close-up view of the second type of cooking vessel support members of FIGS. 11-13, with a cooking vessel placed thereon.
Figure 14:
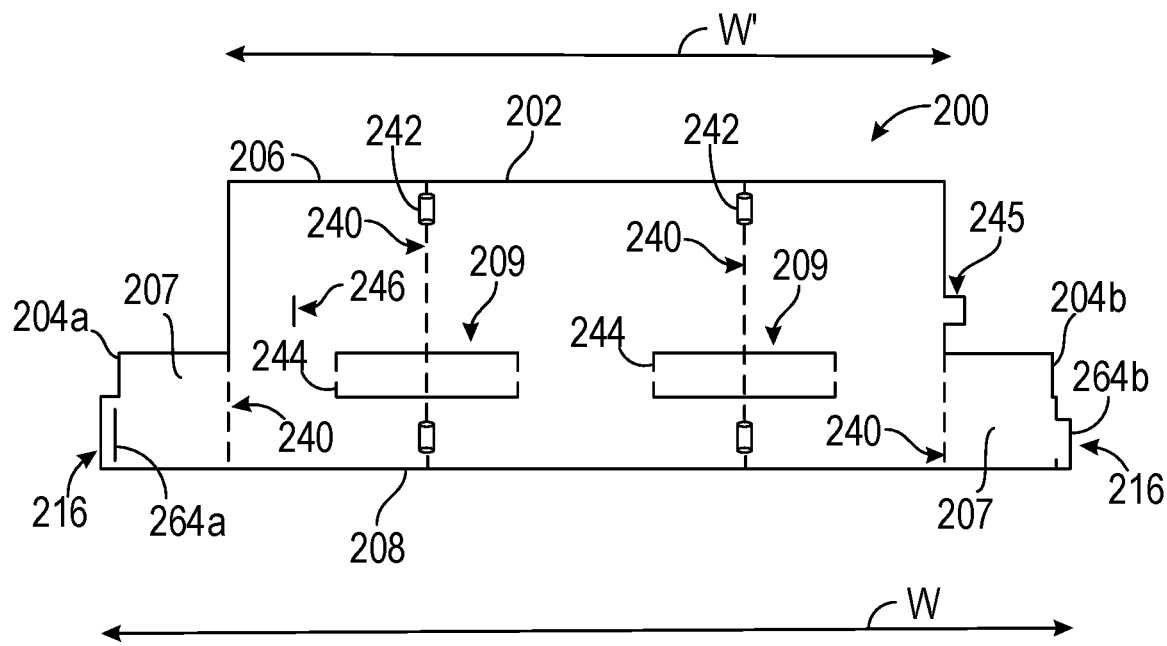
FIG. 14 illustrates a windscreen in a disassembled configuration, according to a second embodiment.

The vents 114 (which also may be referred to herein as "openings 114") may have any shape, such as rectangular (as shown in FIGS. 2-7 and 10-12), circular, ovular, etc. In some embodiments, the vents 114 may be positioned proximate to and/or at the second edge 108 of the body, below the first support members 110 (i.e., between the first support members 110 and the second edge 108). In one such embodiment, the vents 114 are included at the bottom of the body 102 and extend from the bottom edge 108 vertically upward toward the support member 109. In other such embodiments, the vents 114 are spaced away from the bottom edge 108 (as shown in FIGS. 2-7 and 10-12), but still below the first support members 110, between the bottom edge 108 and the first support members 110. However, in other embodiments, the vents 114 may be positioned above the first support members 110. The vents 114 may be positioned at the same height along the body and may be circumferentially arranged symmetrically or asymmetrically along the width W of the body 102. In the examples depicted in FIGS. 2-3 and 6-7, the windscreen 100 includes two vents 114. However, it should be appreciated that the windscreen 100 may include more or less than two vents 114 in other examples. For example, FIGS. 10-12 depict the windscreen 100 as including five vents 114.

When assembled, the vents 114 allow air to be directed to a section of the inner volume 120 of the windscreen 100 housing a fuel source (below the cooking vessel 150). In some embodiments, such as the embodiments shown in FIGS. 2-3, 6-7, and 10-11, the vents 114 may not extend around the entire circumference of the windscreen 100 when the windscreen 100 is assembled into the ready-to-use configuration 118. For example, the vents 114 may be positioned on only one side of axial plane A-A' (dashed and dotted line shown in FIG. 3). As a result of providing the vents 114 on only side of windscreen 100, only a limited amount of airflow (such as only a portion of the wind) is allowed into the inner volume 120 to supply air to a fuel source positioned therein. Further, air can flow into the inner volume 120 but is prevented from flowing out of the inner volume 120 the same direction, thereby minimizing cross winds flowing across the flame ignited at the fuel source. As such, the airflow through the vents 114 is less likely to extinguish a flame ignited at the fuel source. In this way, the vents 114 improve flame stability (and thus heat generation by the flame), as well as heat transfer from the fuel source to the cooking vessel 150. In other examples, however, the vents 214 may extend around the entire circumference of the windscreen 100, from first end portion 104a to the second end portion 104b.

In examples depicted in FIGS. 2-3, 6-7, and 10-12, the vents are fully open. However, in other examples, the vents 114 may be partially open. In some embodiments, the vents 114 may be variable and/or user adjustable. That is, the vents 114 may be configured to be adjusted by a user to increase and/or decrease the opening of the vents 114. For example, the vents may include tabs and/or sliding mechanisms that can be adjusted by a user to control the degree of opening of the vents to adjust airflow through the vents 114. In some embodiments, the vents 114 may be independently adjustable, enabling the user to adjust each of vents 114 individually. In some embodiments, the vents 114 may be configured to be adjusted collectively, allowing the user to adjust all of the vents 114 simultaneously.

In some embodiments, such as the example depicted in FIG. 6, the body 102 may include a notch 162 that is configured to receive a handle of the cooking vessel 150. In some examples, the notch 162 is included on the top edge 106 of the body 102 and forms a recess in the top edge 106 of the body 102. When the notch 162 is included, the handle can extend through the body 102 without obstructing the placement of the cooking vessel on the support members 109.

As discussed above with reference to FIG. 1, the body 102 may be unrolled or flattened to a substantially planar configuration, as depicted in FIGS. 2 and 10. When in this flattened configuration, the body 102 may be rectangular, as depicted in FIGS. 2 and 10. However, in other examples, the body 102 comprise a triangular, elliptical, trapezoidal and/or other regular or non-regular geometric shape. When in a ready-to-use configuration 118 (shown at least in FIGS. 3-4, 6-7, and 11), the body 102 may be substantially cylindrical, such as is depicted in FIGS. 2-13. However, it should be appreciated that in other examples, the body 102 may include an inwards slope or taper (towards the central longitudinal axis 103 of the windscreen 100) to improve wind protection of the cooking vessel 150 and heat source positioned in the inner volume 120, as well as to increase heat transfer between the heat source and the cooking vessel 150. For example, the body 102 may taper from a first diameter at the lower edge 108 to a second, smaller diameter at the upper edge 106 when in the ready-to-use configuration 118. Further, the body 102 may have a non-cylindrical shape, such as quadrangular, when in the ready-to-use configuration 118.

Further, although the body 102 is depicted in FIGS. 2-13 as comprising a single, unitary structure the opposing end portions 104a, 104b of which can be joined and temporarily coupled together with the fastening mechanism 116 to hold the windscreen 100 in the ready-to-use configuration 118, it should be appreciated that in other examples, the body 102 may comprise two or more separate and distinct pieces that may be coupled together by multiple fastening mechanisms 116. For example, the body 102 may comprise two distinct pieces (such as hemispherical pieces), the ends of which may be joined together by at least two of the fastening mechanisms 116 to form a structure, such as the cylindrical structure shown in FIGS. 3-8, and 11, that at least partially encloses the inner volume 120.

FIGS. 14-17 depict a windscreen 200, according to another embodiment. The windscreen 200 may comprise one or more components that are generally similar to one or more components of the windscreen 100. Thus, for conciseness, the components of the windscreen 200 that are similar to the components of the windscreen 100 are labeled similarly and may not include additional description. For example, the windscreen 200 comprises a main body 202 having opposing end portions 204a, 204b, top edge 206, and bottom edge 208, and further comprising support members 209 and a fastening mechanism 216 (corresponding to the main body 102 having the opposing end portions 204a, 204b, top edge 206, and bottom edge 208, the support members 109, and the fastening mechanism 116, respectively, of the windscreen 100).

Unlike the body 102 of windscreen 100, the body 202 of windscreen 200 may be assembled to form a quadrangular shape in the ready-to-use configuration 218 (FIGS. 16-17). Specifically, the body 202 may be folded along four fold lines 240 (FIG. 14) to form the quadrangular shape in the ready-to-use configuration 218. Further, the fold lines 240 may allow the windscreen 200 to be folded and flattened to a storage configuration 228 (as shown in FIG. 15). For example, the body 202 may be folded in the same direction (e.g., inwardly) along the fold lines 240 such that the terminal extension 207 are juxtaposed next to one another, as shown in FIG. 15.

In some embodiments, the windscreen 200 may include hinges 242 (FIG. 14) along the fold lines 240 that are configured to facilitate the folding of the body 202. In embodiments where the windscreen 200 includes the hinges 242, main body 202 may comprise separate and distinct pieces that are coupled to one another by the hinges 242. However, in alternate embodiments where the hinges 242 are not included in the windscreen 200, the main body 202 may comprise a single unitary piece of material.

Further, the body 202 of windscreen 200 may include a cut-out or opening 205 (FIGS. 16-17) on one of the sides of the body 102 that is configured to allow the cooking vessel 250 to be inserted and removed from the side of the windscreen 100 as opposed to the top of windscreen 200, like with the windscreen 100. Specifically, the body 202 may include terminal extensions 207 that are shorter than the rest of the body 202. Thus, the top edge 206 may have a width (W') that is shorter than a width (W) of the bottom edge 208. In this way, when the opposing end portions 204a, 204b of the body 202 are brought together to assemble the body 202 in the ready-to-use configuration 218, the terminal extensions 207 may come together to form the side of the windscreen 200 having the cut-out 205. As elaborated below, at least a portion of the weight of the cooking vessel 250 may be supported by a top surface of the terminal extensions 207 when the windscreen 200 is assembled in the ready-to-use configuration.

Fastening mechanism 216 may be the same as or similar to the tab and slot style fastening mechanism shown in FIGS. 8-9. Specifically, the fastening mechanism 216 may include a notched tab 264b extending from the second end portion 204b of the body 202 that is configured to fit in a corresponding slot 264a positioned at and/or near the first end portion 204a of the body 202. The tab 264b and slot 264a may be included on the terminal extensions 207, since the terminal extensions 207 may define the opposing end portions 204a, 204b of the body 202.

In some examples, the windscreen 200 may further include a secondary fastening mechanism comprising a second notched tab 245 that may extend from one end of the body 202, and may be configured to be inserted into a slot 246 cut into an opposing end of the body 202. As indicated above with reference to FIGS. 8-9, the tab and slots may be aligned so as to allow the notch of a tab to be seated along a lower edge of the corresponding slot.

The support members 209 may extend away from adjacent fold lines 240, such that the support members 209 extend away from the corners of the windscreen 200 along a common side of the windscreen 200 when the windscreen 200 is assembled in the ready-to-use configuration 218. The top of the support members 209 may be horizontally aligned with a top surface of the terminal extensions 207, such that support members 209 and terminal extensions 207 form a substantially flat (e.g., horizontal) cooking surface on which the cooking vessel 250 may be placed. In this way, the terminal extensions 207 and the support members 209 may hold (vertically support) the cooking vessel 250 above the flame. In examples depicted in FIGS. 14-17, two support members 209 are shown, however, other embodiments the windscreen 200 may include a greater or smaller number of support members 209.

In the embodiments depicted in FIGS. 14-17, the support members 209 may be integrally formed with the body 202 by cutting a pair of parallel slits in the body 202. In some embodiments, the slits may be parallel to the top edge 206 and bottom edge 208 of the body 202. The portion of the body 202 positioned between the pair of slits may then be folded inwards along fold lines 244 to form the support members 209. Specifically, in this configuration, the support members 209 may comprise an inwardly folded flaps 232 that extend into the inner volume 220. In such embodiments, the openings formed in the body 202 by folding the flaps 232 radially inwards into the inner volume 220 may form the vents 214. That is, the vents 114 may comprise the opening in the body 202 formed by folding the support members 209 into the inner volume 220. In this way, additional and/or separate vents 114 may not need to be included in the body 202, thus making the windscreen 200 easier and cheaper to manufacture.

As depicted in FIG. 15, the support members 209 may fold inwards when the windscreen 200 is flattened to the storage configuration 228, such that the vents 114 are positioned on the exterior of the body 202 in the storage configuration 228. Further, in the example depicted in FIG. 16, the support members 209 are hollow and substantially rectangular. However, irrespective of the shape, the support members 209 and the terminal extensions 207 are stiff enough to support the weight of the cooking vessel 250, as well as food or liquid contained therein.

Because, the windscreen 200 may be folded and/or flattened to the storage configuration 228, the windscreen 200 may be disassembled without releasing, detaching, and/or otherwise disengaging the fastening mechanism 216. Thus, the storage configuration 228 can be achieved while the fastening mechanism 216 is engaged. In some such embodiments therefore, the fastening mechanism 216 may not be releasable and instead may be a permanent fastening mechanism 216. For example, the terminal extensions 207 may be joined and permanently coupled to one another via welding, adhesives, hinges or other permanent fasteners, and/or other permanent fastening means. In other such embodiments, the terminal extensions 207 may be formed as a single, unitary structure, and may be defined/delineated by a fold line that allows the terminal extensions 207 to be folded relative to one another.

In some embodiments, the cooking vessel 250 may include a sleeve 252 that is configured to receive a handle to removably couple the handle to the cooking vessel 250. In this way, the handle may be removed from the cooking vessel 250 when the cooking vessel 250 is not in use for increased portability.

FIGS. 18-20 depict a cooking vessel assembly 300, according to one embodiment. Cooking vessel assembly 300 may be the same as, or similar to, the cooking vessel assembly 40 described above with reference to FIG. 1 and may be assembled with other cooking gear such as a windscreen (e.g., windscreen 20, windscreen 100, and/or windscreen 200), a fuel source (e.g., fuel source 50), and/or a burner (e.g., burner 60) to form a cooking assembly, such as cooking assembly 10 depicted in FIG. 1. Cooking vessel assembly 300 comprises a cooking vessel, such as the illustrated pot 302, and optionally includes a removable lid 304 for covering the cooking vessel. The pot 302 includes a bottom 306 opposite a top 308, and the bottom 306 of the pot 302 may be configured to be placed on a cooking surface (e.g., support members 29, 109, 209) of the windscreen. As described above, with reference to FIG. 1, the pot 302 may be configured to hold liquid and/or solid contents (i.e., the pot 302 may define an inner volume) and may be constructed from a heat-resistant material that is configured to withstand the heat of the flame generated the fuel source. As depicted in the example of FIG. 20, the bottom 306 of the pot 302 may include a recess 316 that is configured to maintain a desired distance between the flame and the pot 302.

The lid 304 may be positioned on the top 308 of the pot 302 to help retain heat within the pot 302 and preserve the temperature of the contents of the pot 302. The lid 304 may comprise a main body portion 310 and a release tab 312. The main body portion 310 is configured to cover the top 308 of the pot 302 and the release tab 312 is configured to be adjusted (e.g., pulled) by a user to remove the lid 304 from the pot 302. Additionally or alternatively, the release tab 312 may be configured to serve as a handle for the lid 304 when the lid 304 is flipped over and placed upside-down on the pot 302, such as during cooking. In some embodiments, the release tab 312 may comprise a finger slot 314 that is configured to receive a user's finger to facilitate removal of the lid 304 from the pot 302.

In some embodiments, the pot 302 may include a flange 318 positioned at and/or near the top 308 of the pot 302 that is configured to engage with a lip 320 of the lid 304 to help secure the lid 304 on the pot 302 in a snap-fit style releasable coupling arrangement. Thus, the user may push the lip 320 of the lid 304 over the flange 318 of the pot 302 until the lip 320 snaps into place over the flange 318. In some embodiments, the flange 318 may extend around the circumference of the pot 302 at the top 308 and/or the lip 320 may extend around a circumference of the lid 304 at a bottom of the lid 304. However, in other embodiments, the flange 318 and/or lip 320 may not extend around the entire circumferences of the pot 302 and lid 304, respectively, and/or may comprise several flanges 318 and/or lips 320 that are evenly or unevenly spaced around the circumferences of the pot 302 and lid 304, respectively. In alternative embodiments, in lieu of the snap-fit connection, the lid and/or the pot can include other types of securement mechanisms to secure the lid to the pot. For example, one of the lid or the pot can include one or more latches that are configured to engage corresponding features on the other of the lid or the pot.

In some embodiments, FIGS. 18 and 20 show a storage position for the cooking vessel assembly. Thus, when storing and/or transporting the cooking vessel assembly, a windscreen (e.g., windscreen 20, 100, or 200) can be placed in a storage position inside of the pot 302, such as shown in FIG. 5. The lid 304 can then be placed over the open end of the pot 302 and secured in placed, such as via the snap-fit connection described above. When ready for use, the lid 304 can be removed from the pot 302, and the windscreen and the pot can be assembled for use as previously described. When using the pot 302 to cook or heat fluids or solids, the lid 304 can be placed over the open end of the pot 302 in an upside-down position (i.e., the upper surface of the lid in FIG. 20 faces downwardly, the lower surface of the lid in FIG. 20 faces upwardly, and the tab 314 extends upwardly from the main body portion 310). In this manner, lid 304 rests on top of the flange 318 but is not tightly secured to the pot 302, which allows the lid to be safely and easily removed from the pot during or immediately after the cooking process. The release tab 312 may serve as a handle for the lid 304 in this upside-down configuration, allowing a user to easily remove the lid 304 from the pot 302, such as when cooking is complete. Specifically, the release tab 312 may extend above and/or over the top 308 of the pot 302 when the lid 304 is upside-down so that a user can readily grip and/or hold the release tab 312 when removing the lid 304 from the pot 302. In some embodiments, the cooking vessel assembly 300 can be used without a windscreen.

FIG. 21 depicts a method 400 for using a windscreen (e.g., windscreen 20, windscreen 100, windscreen 200, etc.) and/or cooking assembly (e.g., cooking assembly 10) of the present disclosure, according to one embodiment. A user may execute method 400 to use the windscreen and/or cooking assembly. Thus, method 400 is described as being executed by the user herein.

At 402, the user may assemble the windscreen into a ready-to-use configuration (e.g., ready-to-use configuration 118) by bringing opposing end portions (e.g., end portions 104a, 104b) together and connecting/securing them via a fastening mechanism (e.g., fastening mechanism 116). At 404, the user can place a fuel source (e.g., fuel source 50) on a ground surface within the assembled windscreen. For example, at 406, the user can position the assembled windscreen over the fuel source such that the fuel source is enclosed by an inner volume (e.g., inner volume 120) of the assembled windscreen. Next, at 408, the user can place a cooking vessel (e.g., cooking vessel 150) on support members (e.g., support members 109) of the windscreen. In some examples, the user may center the cooking vessel relative to the windscreen and/or the fuel source via horizontal support members (e.g., support members 112) included on the windscreen. The user can light the fuel source before and/or after placing the cooking vessel on the support members at 408 to initiate cooking.

After the cooking is complete and the windscreen is ready to be disassembled for storage, the user may undo, detach, decouple, and/or otherwise disengage the fastening mechanism to disconnect the opposing end portions at 410. In other examples, the user may keep the opposing end portions fastened together and may disassemble the windscreen by simply folding and/or flattening the windscreen.

As explained above, in some examples, the user may roll up the windscreen into a compact storage configuration and store it inside the cooking vessel at 412. In other examples, the user may fold, flatten, and/or otherwise collapse the windscreen to the compact storage configuration to reduce the footprint of the windscreen. In other examples, the windscreen can be rolled up to a smaller diameter (compared to the assembled state) and retained in the rolled-up state by placing a retaining member around the windscreen such as a strap, or a sleeve or cover that extends over the rolled up windscreen.

ADDITIONAL EXAMPLES OF THE DISCLOSED TECHNOLOGY

Clause 1. A windscreen for use in outdoor cooking, comprising:
 a body having an upper edge, a lower edge, and first and second opposing end portions;
 a fastening mechanism for coupling the opposing end portions to assemble the body into a ready-to-use configuration having an inner volume sized for receiving a cooking vessel; and
 one or more cooking vessel support members fixed to an inner surface of the main body, extending from the body into the inner volume, for supporting the cooking vessel in the inner volume.

Clause 2. The windscreen of clause 1, further comprising one or more vents in the body, wherein the vents are positioned below the cooking vessel support members for controlling air flow across a fuel source positioned inside the inner volume, below the cooking vessel.

Clause 3. The windscreen of clause 2, wherein the vents are positioned on only one side of the windscreen.

Clause 4. The windscreen of any of clauses 1-3, wherein the cooking vessel support members comprise first support members that are configured to hold the cooking vessel above a fuel source and further comprise second support members that are configured to center the cooking vessel over the fuel source.

Clause 5. The windscreen of clause 4, wherein the first support members and the second support members are distinct structures that are vertically offset from one another.

Clause 6. The windscreen of any of clauses 4-5, wherein each of the first support members is integrally formed with one of the second support members such that the cooking vessel support members comprise one or more stepped structures.

Clause 7. The windscreen of any of clauses 4-6, wherein the second support members are positioned above the first support members more proximate the upper edge of the body.

Clause 8. The windscreen of any of clauses 4-7, wherein the first support members and the second support members are circumferentially aligned with one another, such that each one of the first support members is aligned along a longitudinal axis with one of the second support members.

Clause 9. The windscreen of any of clauses 4-7, wherein the first support members and the second support members are circumferentially offset from one another.

Clause 10. The windscreen of any of clauses 4-9, wherein the first support members are circumferentially spaced from one another.

Clause 11. The windscreen of any of clauses 4-10, wherein the second support members are circumferentially spaced from one another.

Clause 12. The windscreen of any of clauses 4-11, wherein the first support members extend farther into the inner volume than the second support members.

Clause 13. The windscreen of any of clauses 1-3, wherein the cooking vessel support members are cut and folded out from the body of the windscreen, and wherein an opening in the body formed by cutting and folding the cooking vessel support members out from the body forms one or more vents in the body that are configured to regulate airflow into the inner volume.

Clause 14. The windscreen of any of clauses 1-13, wherein the windscreen is substantially cylindrical in the ready-to-use configuration.

Clause 15. The windscreen of any of clauses 1-13, wherein the windscreen is substantially quadrangular in the ready-to-use configuration.

Clause 16. The windscreen of any of clauses 1-15, wherein the fastening mechanism comprises a first fastening member formed in the first end portion and a second fastening member formed in the second end portion.

Clause 17. The windscreen of clause 16, wherein the first fastening member comprises a first curved surface with a first direction of curvature, the second fastening member comprises a second curved surface with a second direction of curvature, opposite the first direction, and wherein the first fastening member is slidably coupled to the second fastening member.

Clause 18. The windscreen of clause 16, wherein the first fastening member comprises a slot and the second fastening member comprises a notched tab insertable into the slot.

Clause 19. The windscreen of clause 18, wherein the notched tab has a tapered edge, and wherein the tab rests on the slot along the tapered edge.

Clause 20. The windscreen of any of clauses 1-19, wherein the windscreen is made of titanium.

Clause 21. The windscreen of any of clauses 1-20, wherein the windscreen is movable between the ready-to-use configuration and a compact storage configuration.

Clause 22. The windscreen of clause 21, wherein the windscreen is configured to be rolled into the compact storage configuration.

Clause 23. The windscreen of clause 21, wherein the windscreen is configured to be folded and flattened along one or more fold lines into the compact storage configuration.

Clause 24. The windscreen of clause 23, wherein the windscreen comprises one or more hinges positioned along the one or more fold lines that are configured to facilitate the folding of the windscreen.

Clause 25. An assembly for outdoor cooking, comprising:
 a cooking vessel; and
 a windscreen comprising:
  a body having an inner volume in a ready-to-use configuration;
  one or more cooking vessel support members fixed to an inner surface of the body and extending radially inwardly from the inner surface of the body for supporting the cooking vessel received thereon.

Clause 26. The assembly of clause 25, further comprising a fuel source positioned within the inner volume of the body of the windscreen for heating the cooking vessel during the outdoor cooking.

Clause 27. The assembly of any of clauses 25-26, further comprising a removable lid for covering the cooking vessel.

Clause 28. The assembly of clause 27, wherein lid comprises a lip and the cooking vessel comprises a flange, and wherein the lid and cooking vessel are removably coupled to one another via a snap-fit arrangement between the lip and the flange.

Clause 29. The assembly any of clauses 27-28, wherein the lid comprises a release tab that facilitates removal of the lid from the cooking vessel.

Clause 30. The assembly of any of clauses 25-29, further comprising one or more vents in the body, wherein the vents are positioned below the cooking vessel support members for controlling air flow across a fuel source positioned inside the inner volume, below the cooking vessel.

Clause 31. The assembly of clause 30, wherein the vents are positioned on only one side of the windscreen.

Clause 32. The assembly of any of clauses 25-31, wherein the cooking vessel support members comprise first support members that are configured to hold the cooking vessel above a fuel source and further comprise second support members that are configured to center the cooking vessel over the fuel source.

Clause 33. The assembly of clause 32, wherein the first support members and the second support members are distinct structures that are vertically offset from one another.

Clause 34. The assembly of any of clauses 32-33, wherein each of the first support members is integrally formed with one of the second support members such that the cooking vessel support members comprise one or more stepped structures.

Clause 35. The assembly of any of clauses 32-34, wherein the second support members are positioned above the first support members more proximate a top of the body.

Clause 36. The assembly of any of clauses 32-35, wherein the first support members and the second support members are circumferentially aligned with one another, such that each one of the first support members is aligned along a longitudinal axis with one of the second support members.

Clause 37. The assembly of any of clauses 32-35, wherein the first support members and the second support members are circumferentially offset from one another.

Clause 38. The assembly of any of clauses 32-37, wherein the first support members are circumferentially spaced from one another.

Clause 39. The assembly of any of clauses 32-38, wherein the second support members are circumferentially spaced from one another.

Clause 40. The assembly of any of clauses 32-39, wherein the first support members extend farther into the inner volume than the second support members.

Clause 41. The assembly of any of clauses 25-31, wherein the cooking vessel support members are cut and folded out from the body of the windscreen, and wherein an opening in the body formed by cutting and folding the cooking vessel support members out from the body forms one or more vents in the body that are configured to regulate airflow into the inner volume.

Clause 42. The assembly of any of clauses 25-41, wherein the windscreen is movable between the ready-to-use configuration and a compact storage configuration.

Clause 43. The assembly of clause 42, wherein the windscreen is configured to be rolled into the compact storage configuration.

Clause 44. The assembly of clause 42, wherein the windscreen is configured to be folded and flattened into the compact storage configuration.

Clause 45. The assembly of any of clauses 42-44, wherein the windscreen fits within the cooking vessel in the compact storage configuration.

Clause 46. The assembly of any of clauses 25-45, wherein the windscreen is substantially cylindrical in the ready-to-use configuration.

Clause 47. The assembly of any of clauses 25-45, wherein the windscreen is substantially quadrangular in the ready-to-use configuration.

Clause 48. The assembly of any of clauses 25-47, further comprising a fastening mechanism that is configured to selectively hold the body of the windscreen in the ready-to-use configuration Clause 49. The assembly of clause 48, wherein the fastening mechanism comprises a first fastening member having a first direction of curvature and a second fastening member have second direction of curvature, opposite the first direction, that are configured to interlock with one another to hold the windscreen in the ready-to-use configuration.

Clause 50. The assembly of clause 48, wherein the fastening mechanism comprises a first fastening member comprising a slot and a second fastening member comprising a notched tab that is configured to be inserted through the slot to hold the windscreen in the ready-to-use configuration.

Clause 51. A method for using a cooking assembly, comprising:
  assembling a windscreen into a ready-to-use configuration by coupling opposing end portions of a body of the windscreen via a fastening mechanism, the assembled windscreen having a structure with an inner volume;
  placing the structure of the assembled windscreen upright on a cooking surface; and
  setting a cooking vessel on one or more support members of the windscreen to hold the cooking vessel above the cooking surface, wherein the one or more support members extend partially into the inner volume of the assembled windscreen.

Clause 52. The method of clause 51, further comprising placing a fuel source within the windscreen on the cooking surface, below the cooking vessel.

Clause 53. The method of any of clauses 51-52, further comprising regulating airflow into the inner volume via one or more vents positioned below the one or more support members.

Clause 54. The method of any of clauses 51-53, further comprising collapsing the windscreen to a compact storage configuration after a cook cycle.

Clause 55. The method of clause 54, wherein the collapsing the windscreen comprises rolling the windscreen to the compact storage configuration.

Clause 56. The method of clause 54, wherein the collapsing the windscreen comprises folding and flattening the windscreen to the compact storage configuration.

Clause 57. The method of any of clauses 51-56, further comprising placing the windscreen inside the cooking vessel.

Clause 58. A method for using an outdoor cooking assembly, the method comprising:
  during cooking:
    placing a top of a lid on a cooking vessel to retain heat within the cooking vessel; and
  after cooking:
    flipping the lid over and placing a bottom of the lid on the cooking vessel; and
    coupling the lid to the cooking vessel.

Clause 59. The method of clause 58, wherein the coupling the lid to the cooking vessel comprises pushing a lip of the lid over a flange of the cooking vessel to couple the lid and the cooking vessel in a snap-fit type arrangement.

Clause 60. The method of any of clauses 58-59, further comprising, during cooking, placing the cooking vessel within a windscreen on one or more cooking vessel support members of the windscreen that extend radially inwardly from a body of the windscreen.

Clause 61. The method of any of clauses 58-60, further comprising, after cooking, collapsing the windscreen to a compact storage configuration and placing the windscreen inside the cooking vessel prior to coupling the lid to the cooking vessel.

Clause 62. The method of any of clauses 60-61, further comprising positioning a fuel source within the windscreen and lighting the fuel source to initiate cooking.

In the context of the present application, the terms "above" and "below," and "upper" and "lower" are used to refer to the relative vertical positioning of components of the windscreen. These terms refer to the relative vertical positioning of components with respect to ground and/or gravity when the windscreen is assembled in the ready-to-use configuration and is placed on a surface. In the ready-to-use configuration, the lower edge (e.g., lower edge 108, lower edge 208) of the windscreen is intended to be placed on the ground. Thus, the upper edge (e.g., upper edge 106, upper edge 108) is positioned vertically above (with respect to gravity) the lower edge in this ready-to-use configuration. Further, the support members (e.g., support members 109, support members 209) are positioned vertically above (with respect to gravity) the lower edge.

Further the terms "radially inwardly" and "radially outwardly" are directional terms used to refer to movement towards and away from, respectively, a central longitudinal axis (e.g., central longitudinal axis 103) of the windscreen along a plane perpendicular to the central longitudinal axis, such as a horizontal plane (plane parallel to ground) when the windscreen is placed on a surface in the ready-to-use configuration. The central longitudinal axis extends from the bottom edge to the top edge of the windscreen and defines the center of the inner volume (e.g., inner volume 120) of the windscreen when the windscreen is in the ready-to-use configuration.

Further, the terms "axial," "longitudinal," and "vertical" may be used synonymously herein to refer to For purposes of this description, certain aspects, advantages, and novel features of the embodiments of this disclosure are described herein. The described methods, systems, and apparatus should not be construed as limiting in any way. Instead, the present disclosure is directed toward all novel and non-obvious features and aspects of the various disclosed embodiments, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present, or problems be solved.

Features, integers, characteristics, and properties described in conjunction with a particular aspect, embodiment or example of the disclosure are to be understood to be applicable to any other aspect, embodiment or example described herein unless incompatible therewith. All of the features disclosed in this specification (including any accompanying claims, abstract, and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract, and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, systems, and apparatus can be used in conjunction with other systems, methods, and apparatus.

As used herein, the terms "a," "an," and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A," "B," "C," "A and B," "A and C," "B and C," or "A, B, and C."

As used herein, the term "coupled" generally means physically coupled or linked and does not exclude the presence of intermediate elements between the coupled items absent specific contrary language.

Directions and other relative references (e.g., inner, outer, upper, lower, etc.) may be used to facilitate discussion of the drawings and principles herein, but are not intended to be limiting. For example, certain terms may be used such as "inside," "outside,", "top," "down," "interior," "exterior," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same. As used herein, "and/or" means "and" or "or," as well as "and" and "or."

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

The invention claimed is:

1. A windscreen for use in outdoor cooking, comprising:
 a main body having an upper edge, a lower edge, and first and second opposing end portions;
 a fastening mechanism for coupling the opposing end portions to assemble the main body into a ready-to-use configuration having an inner volume sized for receiving a cooking vessel; and
 one or more cooking vessel support members fixed to an inner surface of the main body, extending from the main body into the inner volume, for supporting the cooking vessel in the inner volume;
 wherein the cooking vessel support members comprise stepped structures, each stepped structure comprising a first projection integrally formed with a second projection, wherein the first projection extends from the main body a first distance and the second projection extends from the main body a second distance that is less than the first distance, wherein the first projection comprises a horizontally disposed upper surface for supporting the cooking vessel within the main body when the main body is in the ready to-to-use configuration, and wherein the second projection comprises a vertically extending side surface adapted to contact an outer side surface of the cooking vessel for centering the cooking vessel within the main body when the main body is in the ready to-to-use configuration.

2. The windscreen of claim 1, further comprising one or more vents in the main body, wherein the vents are positioned below the cooking vessel support members for controlling air flow across a fuel source positioned inside the inner volume, below the cooking vessel.

3. The windscreen of claim 2, wherein all of the vents are located below the cooking vessel support members.

4. The windscreen of claim 1, wherein the first projections extend farther into the inner volume than the second projections and are positioned below the second projections more proximate the lower edge of the body.

5. The windscreen of claim 1, wherein the cooking vessel support members are cut and folded out from the main body of the windscreen, and wherein an opening in the main body formed by cutting and folding the cooking vessel support members out from the body forms one or more vents in the main body that are configured to regulate airflow into the inner volume.

6. The windscreen of claim 1, wherein the fastening mechanism comprises a first fastening member formed in the first end portion and a second fastening member formed in the second end portion.

7. The windscreen of claim 6, wherein the first fastening member comprises a first curved surface with a first direction of curvature, the second fastening member comprises a second curved surface with a second direction of curvature, opposite the first direction, and wherein the first fastening member is slidably coupled to the second fastening member.

8. The windscreen of claim 6, wherein the first fastening member comprises a slot and the second fastening member comprises a notched tab insertable into the slot.

9. The windscreen of claim 1, wherein the windscreen is movable between the ready-to-use configuration and a compact storage configuration.

10. The windscreen of claim 9, wherein the windscreen is configured to be rolled into the compact storage configuration, wherein when the windscreen is in the compact storage configuration, the main body is in a rolled configuration with the first end portion radially inside of the second end portion.

11. The windscreen of claim 9, wherein the windscreen is configured to be folded and flattened along one or more fold lines into the compact storage configuration.

\* \* \* \* \*